(12) United States Patent
Shimizu et al.

(10) Patent No.: US 8,082,579 B2
(45) Date of Patent: Dec. 20, 2011

(54) ACCESS SERVER AND CONNECTION RESTRICTION METHOD

(75) Inventors: Shinsuke Shimizu, Yokohama (JP); Hiroaki Miyata, Yokohama (JP); Daiki Nozue, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 642 days.

(21) Appl. No.: 12/145,778

(22) Filed: Jun. 25, 2008

(65) Prior Publication Data

US 2009/0070863 A1 Mar. 12, 2009

(30) Foreign Application Priority Data

Sep. 12, 2007 (JP) .................................. 2007-236333

(51) Int. Cl.
*G06F 21/00* (2006.01)
*H04L 29/06* (2006.01)
(52) U.S. Cl. .............................. 726/12; 726/13; 713/154
(58) Field of Classification Search .................. 726/1, 2, 726/11–14; 713/154
See application file for complete search history.

(56) References Cited

U.S. PATENT DOCUMENTS

| 3,605,343 | A | 9/1971 | Knecht |
| 5,590,180 | A | 12/1996 | Tonomura et al. |
| 2003/0028532 | A1 | 2/2003 | Dougu et al. |
| 2003/0115482 | A1* | 6/2003 | Takihiro et al. ................ 713/201 |
| 2006/0133399 | A1* | 6/2006 | Chang et al. .................... 370/420 |
| 2006/0150240 | A1* | 7/2006 | Robinson et al. .................. 726/4 |
| 2006/0277564 | A1* | 12/2006 | Jarman ............................ 725/25 |
| 2007/0264981 | A1* | 11/2007 | Miller ......................... 455/414.1 |

FOREIGN PATENT DOCUMENTS

| JP | 2003-174482 | 6/2003 |
| JP | 2006-60862 | 3/2006 |

* cited by examiner

*Primary Examiner* — Gilberto Barron, Jr.
*Assistant Examiner* — Malcolm Cribbs
(74) *Attorney, Agent, or Firm* — Antonelli, Terry, Stout & Kraus, LLP.

(57) ABSTRACT

The access server receives an authentication packet including an authentication result, a port change setting information, a port change time, a filtering setting information and a filtering time from the authentication server. The access server stores the respective information in the authentication packet into a memory. The access server refers to the memory, and in the case where the port change setting information on an arbitrary user identifier is set to perform port change, when it becomes the port change time, the access server changes the output destination of a packet from a user terminal to, for example, a proxy server B from a proxy server A. Besides, in the case where the filtering setting information on an arbitrary user identifier is set to perform filtering, when it becomes the filtering start time, the access server performs filtering on the port to which the user terminal is connected.

16 Claims, 24 Drawing Sheets

| USER ID | TRANSMISSION SOURCE IP ADDRESS | USER TERMINAL PORT NUMBER | PPP SESSION ID | PORT CHANGE | PORT FILTERING | OBJECT PORT NUMBER |
|---|---|---|---|---|---|---|
| abc | 192.168.0.10 | #1 | 100 | — | — | — |
| efg | 192.168.0.20 | #2 | 101 | ON | — | #5 |
| hij | 192.168.0.30 | #3 | 102 | — | ON | — |
| opq | 192.168.0.40 | #4 | 103 | ON | — | #7 |

FIG. 4

| USER ID | USER TERMINAL ACCESS TIME | AUTHENTICATION SERVER AUTHENTICATION COMPLETION TIME | PORT CHANGE START TIME | PORT CHANGE END TIME | PORT FILTERING START TIME | PORT FILTERING END TIME |
|---|---|---|---|---|---|---|
| abc | 23 : 23:00 | 23 : 23:05 | — | — | — | — |
| efg | 20 : 00:00 | 20 : 00:05 | 22:00 | 08:00 | — | — |
| hij | 21 : 00:00 | 21 : 00:05 | — | — | 22:00 | 08:00 |
| opq | 20 : 00:00 | 20 : 00:05 | 22:00 | 08:00 | — | — |

FIG. 5

| DESTINATION IP ADDRESS | NEXT HOP | PORT NUMBER |
|---|---|---|
| 192.168.0.10/32 | Connected | 1 |
| 201.10.10.10/32 | Connected | 7 |
| 203.10.10.10/32 | 201.10.10.10/32 | 7 |
| 200.10.10.10/32 | Connected | 5 |

FIG. 6

| USER ID | PASSWORD | PORT CHANGE | PORT CHANGE START TIME | PORT CHANGE END TIME | PORT FILTERING | PORT FILTERING START TIME | PORT FILTERING END TIME |
|---|---|---|---|---|---|---|---|
| abc | XXXXX | — | — | — | — | — | — |
| efg | XXXXX | ON | 22 : 00 | 8 : 00 | — | — | — |
| hij | XXXXX | — | — | — | ON | 22 : 00 | 08 : 00 |
| opq | XXXXX | ON | 22 : 00 | 8 : 00 | — | — | — |

FIG. 8

| USER ID | TRANSMISSION SOURCE IP ADDRESS | USER TERMINAL PORT NUMBER | PPP SESSION ID | PORT CHANGE | PORT FILTERING | OBJECT PORT NUMBER |
|---|---|---|---|---|---|---|
| abc | 192.168.0.10 | #1 | 100 | — | — | — |
| efg | 192.168.0.20 | #2 | 101 | ON | — | #6 |
| hij | 192.168.0.30 | #3 | 102 | — | ON | — |
| opq | 192.168.0.40 | #4 | 103 | ON | — | #7 |

FIG. 14

| USER ID | TRANSMISSION SOURCE IP ADDRESS | USER TERMINAL PORT NUMBER | PPP SESSION ID | PORT CHANGE | PORT FILTERING | OBJECT PORT NUMBER |
|---|---|---|---|---|---|---|
| abc | 192.168.0.10 | #1 | 100 | — | — | — |
| efg | 192.168.0.20 | #2 | 101 | ON | — | #5 |
| hij | 192.168.0.30 | #3 | 102 | — | ON | — |
| opq | 192.168.0.40 | #4 | 103 | ON | — | #7 |

FIG. 15

| USER ID | TRANSMISSION SOURCE IP ADDRESS | USER TERMINAL PORT NUMBER | PPP SESSION ID | PORT CHANGE | PORT FILTERING | OBJECT PORT NUMBER |
|---|---|---|---|---|---|---|
| abc | 192.168.0.10 | #1 | 100 | – | – | – |
| efg | 192.168.0.20 | #2 | 101 | ON | – | #7 |
| hij | 192.168.0.30 | deny | 102 | – | ON | – |
| opq | 192.168.0.40 | #4 | 103 | ON | – | #7 |

FIG. 19

| USER ID | TRANSMISSION SOURCE IP ADDRESS | USER TERMINAL PORT NUMBER | PPP SESSION ID | PORT CHANGE | PORT FILTERING | OBJECT PORT NUMBER |
|---|---|---|---|---|---|---|
| abc | 192.168.0.10 | #1 | 100 | — | — | — |
| efg | 192.168.0.20 | #2 | 101 | ON | — | #5 |
| hij | 192.168.0.30 | #3 | 102 | — | ON | — |
| opq | 192.168.0.40 | #4 | 103 | ON | — | #8 |

| USER ID | TRANSMISSION SOURCE IP ADDRESS | USER TERMINAL PORT NUMBER | PPP SESSION ID | PORT CHANGE | PORT FILTERING | OBJECT PORT NUMBER |
|---|---|---|---|---|---|---|
| abc | 192.168.0.10 | #1 | 100 | — | — | — |
| efg | 192.168.0.20 | #2 | 101 | ON | — | #5 |
| hij | 192.168.0.30 | #3 | 102 | — | ON | — |
| opq | 192.168.0.40 | #4 | 103 | ON | — | #7 |

Columns: 2240-11, 2240-12, 2240-13, 2240-14, 2240-15, 2240-16, 2240-17

FIG. 23

TYPE : 1 USER NAME
TYPE : 2 ID
.
.
TYPE : x PORT CHANGE
TYPE : y PORT FILTERING

ACCESS SERVER AND CONNECTION RESTRICTION METHOD

BACKGROUND OF THE INVENTION

The present invention relates to an access server and a connection restriction method, and particularly to filtering by a terminal or a communication system, and to an access server and a connection restriction method which is provided with a function to be capable of controlling the restriction of a time period when, even after a user terminal is authenticated, the user terminal can communicate by the access server.

A cellular phone, a personal computer, and a portable game machine become widespread in daily life, and the environment becomes such that the Internet can be used. Everybody, including children, uses a service such as a site access, download of music, or download of games through the Internet. Although everybody can use the Internet, there is a problem that a child accesses a harmful site such as a dating site and is harmed. Besides, from the viewpoint of leakage of personal information, also for the purpose of preventing the information from carelessly leaking, the access restriction to the harmful site is an important function.

A filtering technique is used for the access restriction to the harmful site, and for example, there is one in which a dedicated tool provided by an Internet browser or an Internet service provider (hereinafter referred to as ISP) is installed in a client terminal, and filtering is performed. Besides, for example, there is one in which filtering is performed by a house external apparatus such as a home router, there is one in which a proxy server is used in the network of an in-house LAN of a company or the like (see, for example, patent document 1), or there is one in which filtering is performed by the Web gateway server of a contract ISP.

As functions of the filtering, for example, there is one using a keyword (such as, for example, violence), there is one in which a specified Web address is not displayed or only a specified Web address is displayed, or there is one in which a display is inhibited according to a time period.

In the restriction using the keyword, inappropriate keywords are previously listed, and in the case where the keyword is included in a specified URL, the page of the Web is not displayed. However, there is a possibility of erroneous recognition that even if showing may be made for a URL, in case the keyword is included, the display can not be performed.

In the case of the restriction using a Web address, when the page of a specified Web address is not displayed, there is no effect on an unregistered URL. On the other hand, when the page of a specified Web address is displayed, Web pages which are freely seen are few. In the case where it is taken into consideration that a child sees a site, the child tends to desire to see what can not be seen by using any means from curiosity, and for example, the child may directly write the address of the URL of a harmful site to access it, and therefore, the restriction using the keyword or the web address has a problem in usefulness as the filtering.

In the case of the restriction using the time period, the restriction time is set, so that the excessive use of the Internet is prevented, and the use of a child in the time period when parents are absent can be restricted. There is known that detailed setting such as designation of a keyword or a Web address is not required, and the filtering can be performed without piquing child's curiosity and without being noticed by the child.

As the restriction using the time period, for example, as described before, there is one in which the dedicated tool is installed in the client terminal and the restriction is performed by the software, or there is one in which in the network of an in-house LAN of a company or the like, an administrator executes the restriction by using a database by a proxy server (see patent document 1), a Web gate server of an ISP or the like.

Besides, in JP-A-2006-60862 (patent document 2), there is disclosed a communication method in which information delivery is controlled by, for example, a time period. In this method, for example, when the user obtains information, a communication apparatus including a timer circuit uses the timer to compare the contents registered in a database in advance, with an information provision start time and an end time registered in the database, and when it becomes the start time, the requested information is delivered after connection to the communication network of the user, and when it becomes the end time, the delivery to the communication network of the user is stopped.

Further, in a communication apparatus accommodating subscribers, as a communication method of controlling network connection of each user terminal after authentication, there is one disclosed in, for example, JP-A-2003-174482 (patent document 3). In this method, for example, at the time when the user terminal requests connection to the Internet, the communication apparatus previously constructs the closed network by bridge connection or router connection after authentication. The method is such that after the closed network is constructed, the communication apparatus changes the management table of the communication apparatus in accordance with the setting request of the filter information from the terminal, and the filtering condition of the terminal can be freely changed.

[Patent document 1] Japanese Patent No. 3605343
[Patent document 2] JP-A-2006-60862
[Patent document 3] JP-A-2003-174482

However, with respect to the access time setting by the user himself/herself using the software tool of the user terminal or the home router, it is the condition that for example, the dedicated tool is installed, and in the case where it has been uninstalled, or the time setting is not accurately performed in the terminal, access to a harmful site in a time period becomes possible by the operation mistake of the user. Besides, since the setting is performed in the terminal, a user using it releases the restriction and can access a site.

In the technique disclosed in patent document 1 in which the proxy server is used in the in-house LAN or the like, since the filtering is performed by the dedicated proxy server, it is suitable for a small network such as the in-house LAN, however, in the case of a large-scale network in which the kinds and forms of user terminals vary and for example, wired and wireless terminals are included, it is necessary to install the same proxy server in each network. Besides, since one proxy server has many databases, the load is large, and there remains a problem also in redundancy.

In the execution of filtering by the Web gate server at the ISP side, it is the use condition to contract with the ISP, and the content of the service varies according to each ISP.

Besides, as the communication method in which the control of information delivery can be made by the time period, in the technique disclosed in patent document 2, desired information can be delivered in the desired time to the previously registered network of the user by the management of the timer of the communication apparatus and the database, however, only the desired information is registered in the database, and the communication condition of the user can not be restricted. For example, with respect to information not desired to be seen or unwanted information, the restriction is not made based on the time period, and everybody can acquire the information not desired to be seen or the unwanted information.

Further, in the communication apparatus accommodating subscribers, as the communication method for controlling the network connection of each user terminal after authentication, in the technique disclosed in patent document 3, the closed network is constructed after the authentication, the communication apparatus changes the management table of the communication apparatus in accordance with the setting request of the filter information from the terminal, and can freely change the filtering condition of the terminal. However, since the setting change of the filtering is based on the notification from the terminal, for example, in the case where the filtering condition in the time period is desired to be performed (for example, the filter condition is not provided in the daytime, and the filtering condition is made strict in the night), since the notification is required twice a day, a complicated operation is required. When the notification is forgotten, for example, there is a possibility that the filtering condition in the night is applied in the daytime, and the management of the filtering service based on the time setting is difficult.

It is required that independently of the form of a user terminal such as a wired or wireless terminal or the service function at the ISP side, the access server capable of accommodating subscribers or ISPs has a function to be able to restrict communication based on a time period and a function to perform distribution to apparatuses restricted in communication and web browsing.

SUMMARY OF THE INVENTION

In view of the above, it is an object of the invention to provide an access server which has a function to restrict communication in a time period and realizes authentication not requiring complicated setting by cooperation with an authentication server.

It is another object of the invention to disperse the load of a proxy server in a time period by changing a port of the proxy server connected to the access server according to the time period even after authentication of a user terminal and to restrict Web browsing of the user terminal according to the time period by a proxy server different in a use condition of HTTP.

Besides, it is another object of the invention to restrict Web browsing of the user terminal according to the time period by a router having a filtering function by changing a port of the router connected to the access server similarly to the above even if the IP address of the proxy server is not known.

It is another object of the invention to restrict the communication of the user terminal according to the time period by filtering a port of the user terminal connected to the access sever according to the time period.

In order to achieve the above object, an access server includes plural ports 21-$n$ capable of accommodating plural user terminals or communication networks described later in FIG. 2, a packet processing unit 22, a port conversion unit 22-1, a filtering unit 22-2, a control unit 23 and a timer circuit 24.

When a PPP session connection is made from the user terminal, a transmission source IP address 2240-12 of the terminal and a user terminal port number 2240-13 to which the user terminal is connected are stored in a user management table 224-1 of the access server described later in FIG. 4, and a user terminal access time 2240-22 of a time period management table 224-2 of the access server described later in FIG. 5 is stored.

After the storing and after the establishment of the PPPoE (PPP over Ether) session, information necessary for authentication of the user terminal is transmitted to an authentication server 14 in the communication system, the authentication server checks the contents of an authentication server authentication management table described later in FIG. 8, the result is stored in an authentication packet 300 of the authentication server described later in FIG. 7 and is transmitted to the access server 6, the access server 6 extracts the contents of the authentication packet 300, stores an user ID 2240-11 of the terminal, a PPP session ID 2240-14, a port change 2240-15, and a port filtering setting information 2240-16 into the user management table 224-1 of the access server 6 described later in FIG. 4, and stores an authentication server authentication completion time 2240-23, a port change start time 2240-24, a port change end time 2240-25, a port filtering start time 2240-26, and a port filtering end time 2240-27 into the time period management table 224-2 of the access server described later in FIG. 5.

After the storage, the timer circuit 24 described later in FIG. 2 is started in accordance with the contents of the port change 2240-15 and the port filtering setting information 2240-16 of the user terminal of the user management table 224-1 of the access server described later in FIG. 4.

After the start, from the contents of the user management table 224-1 of the access server described later in FIG. 4 and the time period management table 224-2 described later in FIG. 5, the packet processing unit 22 described later in FIG. 3 determines whether the terminal is a user for which a port in a time period is changed or a user for which a session is disconnected (filtering).

As a result of the determination, when the user is an objective user and the time indicated by the timer circuit 24 described later in FIG. 2 is within the set time of the time period management table 224-2 of the access server described later in FIG. 5, the user is the user for which the port is changed, and in the case where the user terminal knows an IP address of a proxy server, a port of a first proxy server connected to the access server is changed to a port of a second proxy server by the port conversion unit 22-1 described later in FIG. 2. When the timer in the timer circuit 24 described later in FIG. 2 is expired, the port of the proxy server connected to the access server is changed by the conversion unit 22-1 described later in FIG. 2, and is returned to the original port.

On the other hand, in the case where the user terminal does not know the IP address of the proxy server, the access server changes a port of a connected router A (10) to a port of a router B (15) by the port conversion unit 22-1 described later in FIG. 2. When the timer in the timer circuit 24 described later in FIG. 2 is expired, the access server changes the port of the connected router B (15) by the conversion unit 22-1 described later in FIG. 2 and returns it to the port of the original router A (10).

Besides, in the case of the user for which filtering is performed on the port of the user terminal, the port filtering is performed on the port of the user terminal by the filtering unit 22-2 described later in FIG. 2. The kind (for example, ICMP: Internet Control Message Protocol or FTP: File Transfer Protocol can be used) of the packet on which the port filtering is performed does not limit the invention. Until the timer in the timer circuit 24 described later in FIG. 2 is expired, the filtering is performed on the port of the user terminal.

The access server of the invention is, for example, an access server that accommodates plural user terminals and performs a PPP session connection to the plural terminals, and includes plural ports to transmit and receive packets to and from the plural user terminals or an authentication server, and a processing unit to perform a necessary process based on contents of the packet received by one of the plural ports and to make an output to one of the plural ports, and one of features is that when AccessAck by an authentication packet of the authentication server is received from one of the plural user terminals, the processing unit records information of the terminal and necessary information from an attribute pair of the authentication packet into a storage unit, and identifies whether the terminal is a user that is distributed to plural proxy servers according to a time period or a user for which filtering is performed on the port of the user terminal according to a time period.

One of features is that from the attribute pair of the authentication packet, in the case of the user that is distributed to the proxy servers according to the time period, the access server stores the information of distribution start time/end time into the storage unit of the access server, and in the case of the user for which filtering is performed on the port of the user terminal according to the time period, the access server stores filtering start time/end time, and those times can be managed by a timer circuit.

One of features is that in the case of the user that is distributed to the proxy servers, the access server changes the port of the proxy server based on the information of the distribution start time/end time, the user management table in the access server, the time period management table, and the timer circuit.

One of features is that in the case of the user for which the filtering is performed on the port of the user terminal, the access server performs the filtering on the port of the user terminal based on the information of the port filtering start time/end time, the user management table in the access server, the time period management table, and the timer circuit.

One of features is that the access server can perform both systems in which the terminal can be distributed to the plural proxy servers according to the time period, and the filtering is performed on the port of the user terminal.

One of features is that the access server accommodates any form of user terminal such as, for example, a wired or a wireless terminal, and can perform the function to distribute it to the proxy servers, and the function to perform the filtering on the port of the user terminal.

One of features is that the access server can restrict Web browsing of the user terminal according to the time period by distributing it to the proxy servers different from each other in the user condition of HTTP according to the time period.

One of features is that after authentication execution of a user terminal, the access server can restrict the time period in which the user terminal can communicate.

One of features is that the access server can disperse the load, in a time period, of the proxy server connected to the access server by converting the port of the access server in each time period.

One of features is that by changing the port of the access server in each time period, the access server can perform filtering in the time period by a router equivalent to an L7 switch linked to a DNS server even in the case where the terminal does not know the address of the proxy server.

According to the first solving means of this invention, there is provided an access server in a network system including an authentication server, a first server or a first communication apparatus to perform a first access restriction or not to perform the access restriction to an access from a user terminal to a site, a second server or a second communication apparatus to perform a second access restriction to the access from the user terminal to the site, and the access server, the access server comprising:

a plurality of ports for connection with the user terminal, the authentication server, the first server and/or the first communication apparatus, and the second server and/or the second communication apparatus;

a port conversion unit to change, according to a time period, an output destination port of a packet from the user terminal to one of the port to which the first server or the first communication apparatus is connected and the port to which the second server or the second communication apparatus is connected;

a filtering unit to perform filtering on the port to which the user terminal is connected;

an authentication processing unit to perform a process for authentication of the user terminal by communicating with the authentication server; and a memory to store port change setting information to indicate whether port change is performed for the user terminal, one or plural port change times, filtering setting information to indicate whether filtering is performed for the user terminal, a filtering start time and a filtering end time correspondingly to a user identifier, wherein the authentication processing unit transmits an authentication request to the authentication server when an access is made from the user terminal, receives an authentication packet including an authentication result, the port change setting information, the port change time, the filtering setting information and a filtering time from the authentication server, the authentication processing unit stores the port change setting information, the port change time, the filtering setting information, the filtering start time and the filtering end time included in the authentication packet into the memory correspondingly to the user identifier, the port conversion unit refers to the memory, and in a case where the port change setting information is set to perform the port change on an arbitrary user identifier, when it becomes the corresponding port change time, the port conversion unit changes an output destination of a packet from the user terminal of the user identifier, and the filtering unit refers to the memory, and in a case where the filtering setting information for an arbitrary user identifier is set to perform the filtering, when it becomes the corresponding filtering start time, the filtering unit performs the filtering on the port to which the user identifier is connected.

According to the second solving means of this invention, there is provided a connection restriction method in a network system including an authentication server, a first server or a first communication apparatus to perform a first access restriction or not to perform the access restriction to an access from a user terminal to a site, a second server or a second communication apparatus to perform a second access restriction to an access from the user terminal to the site, and an access server, the connection restriction method comprising:

transmitting, by the access server, an authentication request to the authentication server when the access is performed from the user terminal;

receiving, from the authentication server, an authentication packet including an authentication result, a port change setting information to indicate whether port change is performed for the user terminal, one or plural port change times, a filtering setting information to indicate whether filtering is performed for the user terminal, a filtering start time and a filtering end time;

storing, correspondingly to a user identifier, the port change setting information, the port change time, the filtering setting information, the filtering start time and the filtering end time included in the authentication packet into a memory;

referring to the memory to change, in a case where the port change setting information on an arbitrary user identifier is set to perform the port change and when it becomes the corresponding port change time, an output destination of a packet from the user terminal of the user identifier to one of a port to which the first server or the first communication apparatus is connected and a port to which the second server or the second communication apparatus is connected; and performing, in a case where the filtering setting information on an arbitrary user identifier is set to perform the filtering and when it becomes the corresponding filtering start time, the filtering on the port to which the user identifier is connected.

According to the invention, it is possible to provide an access server which has a function to restrict communication in a time period and realizes authentication not requiring complicated setting by cooperation with an authentication server.

According to the invention, it is possible to disperse the load of a proxy server in a time period by changing a port of the proxy server connected to the access server according to the time period even after authentication of a user terminal and to restrict Web browsing of the user terminal according to the time period by a proxy server different in a use condition of HTTP.

Besides, According to the invention, it is possible to restrict Web browsing of the user terminal according to the time period by a router having a filtering function by changing a port of the router connected to the access server similarly to the above even if the IP address of the proxy server is not known.

According to the invention, it is possible to restrict the communication of the user terminal according to the time period by filtering a port of the user terminal connected to the access sever according to the time period.

BRIEF DESCRIPTION OF THE DRAWINGS

FIG. 4 is a structural example of a user management table of the access server.

FIG. 5 is a structural example of a time period management table of the access server.

FIG. 6 is a structural example of a routing table of the access server.

FIG. 8 is a structural example of an authentication server management table of the authentication server.

FIG. 14 is an explanatory view of a user management table after port change (port number #6) in the operation example 2.

FIG. 15 is an explanatory view of the user management table after port change (port number #5) in the operation example 2.

FIG. 19 is an explanatory view of a user management table in the operation example 3.

FIG. 22 is an explanatory view of a user management table after port change (port number #8) in the operation example 4.

FIG. 23 is an explanatory view of the user management table after port change (port number #7) in the operation example 4.

DETAILED DESCRIPTION OF THE INVENTION

Hereinafter, embodiments of the invention will be described in detail with reference to the drawings.
(System Structure)

Figure 1:
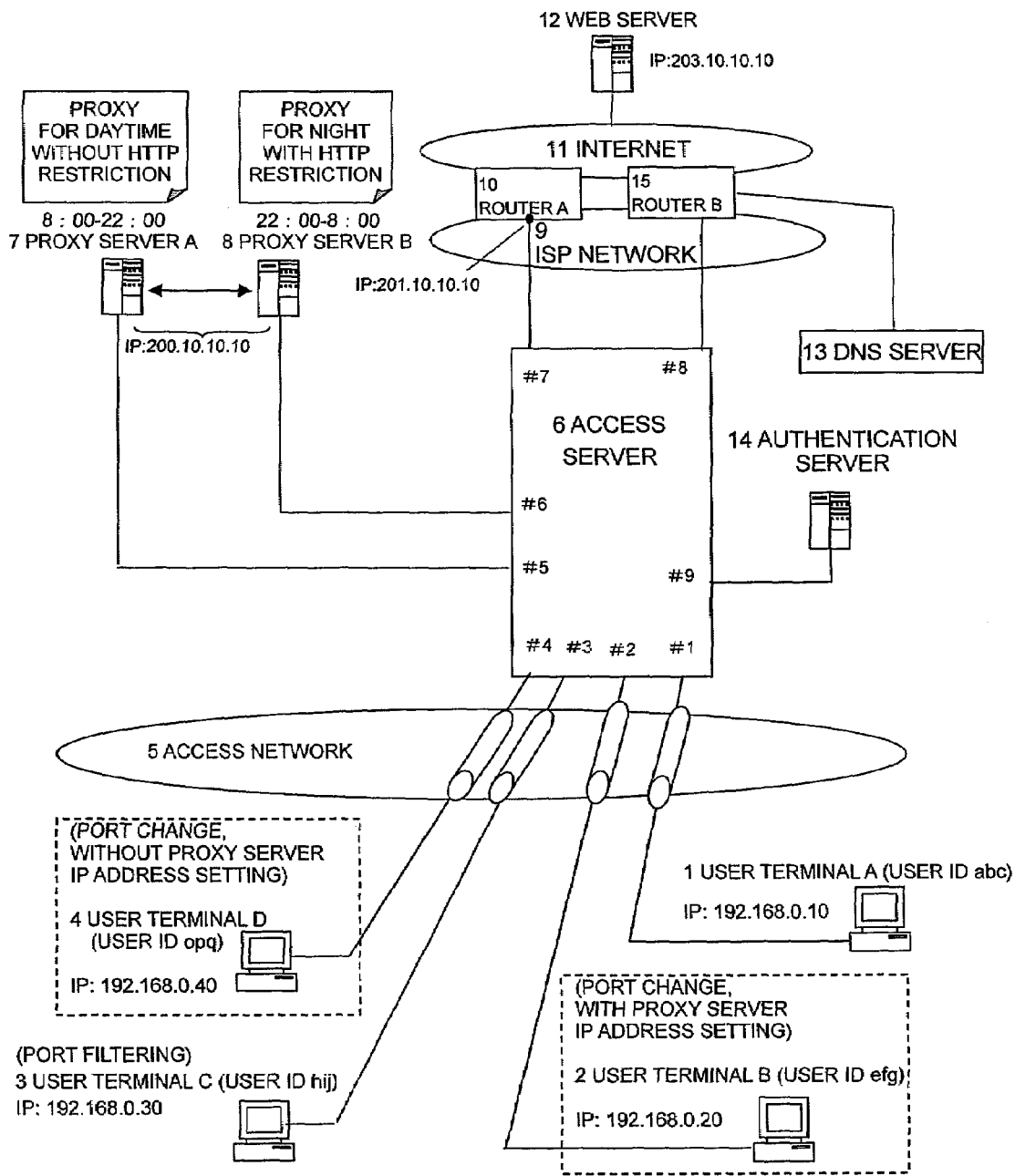
FIG. 1 is a structural view of a communication system of an embodiment.

FIG. 1 is a view showing the whole of a communication system (network system, access restriction system) in which an access server of an embodiment is used.

The communication system includes, for example, an access server 6, a proxy server A (first server) 7, a proxy server B (second server) 8, a router A (first communication apparatus) 10, a router B (second communication apparatus) 15, a web server 12, a DNS server 13 and an authentication server 14.

The access server 6 is connected with an access network 5 (access server port numbers #1 to #4), an ISP network 9 (access server port numbers #7 and #8), the authentication server 14 (access server port number #9), the proxy server A (7) (access server port number #5) and the proxy server B (8) (access server port number #6).

The proxy server A (7) is, for example, the proxy server for the daytime, and can be used from 8:00 to 20:00, and restriction of HTTP is not particularly provided. Incidentally, the HTTP restriction (first access restriction) different from that of the proxy server B (8) may be provided. The proxy server B is, for example, the proxy server for the night, and is used from 22:00 to 8:00, and restriction (second access restriction) of HTTP (Hyper Text Transfer Protocol) is provided. As the restriction of the HTTP, it is assumed that a filtering function can be freely set, for example, a keyword is used in the function of the HTTP filtering, or a specified Web address is not displayed. An IP address (200.10.10.10) is assigned to both the proxy servers.

Under the access network 5, the access server 6 accommodates a user terminal A (1) (access server port number #1), a user terminal B (2) (access server port number #2), a user terminal C (3) (access server port number #3), and a user terminal D (4) (access server port number #4). The terminals under the access network 5 are authenticated by the authentication server 14 through the access server 6.

An IP address (192.168.0.10/32) and a user ID (abc) are previously assigned to the user terminal A (1). Hereinafter, similarly, an IP address (192.168.0.20/32) and a user ID (efg) are assigned to the user terminal B (2), an IP address (192.168.0.30/32) and a user ID (hij) are assigned to the user terminal C (3), and an IP address (192.168.0.40/32) and a user ID (opq) are assigned to the user terminal D (4). Incidentally, the user terminal may be a terminal that performs wired communication, and the user terminal and the access server 6 may be connected through wire, or the user terminal may be a terminal that performs wireless communication, and at least a part between the user terminal and the access server 6 may be connected through wireless.

The ISP network 9 is connected to Internet 11 through the router A 10 or the router B 15. By this, the user terminal under the access network 5 can access the Web server 12 (IP address is 203.10.10.10).

In the communication system of this embodiment, when a PPP (Point to Point Protocol) session connection request is issued from a user terminal under the access network 5, a PPPoE session is established between the user terminal and the access server 6. Thereafter, in order to establish the PPP session, the access server 6 inquires of the authentication server 14 about authentication. The authentication server 14 includes an authentication server management table (400-3) (described later in FIG. 8) previously storing information of user terminals. The access server 6 transmits an authentication packet 300 described later in FIG. 7 to the authentication server 14 in order to inquire about the authentication. The authentication server 14 checks the information of the authentication server management table (400-3) of FIG. 8, writes the inquiry result (authentication result) and specified information into the authentication packet 300 and transmits it to the access server 6. The access server 6 extracts the information from the authentication packet 300 transmitted from the authentication server 14 and stores it in a user management table 224-1 of FIG. 4 described later and a time period management table 224-2 of FIG. 5 described later.

As a result of the storage, from the user management table 224-1 of FIG. 4 described later, the access server 6 recognizes whether a port change 2240-15 or a port filtering 2240-16 is set for the user terminal from an attribute value pair 3000-16 of the authentication packet 300 of FIG. 7 described later. In the case where the user terminal is an object of either of them, a timer of a timer circuit 24 of FIG. 2 described later is started. Next, in the case where the user terminal is the port change user and knows the address of the proxy server, a time period management table 224-2 of FIG. 5 described later and the present time of the access server 6 are compared, and when the present time is within the time stored in the time period management table 224-2 of FIG. 5 described later, the port change of the proxy server connected to the access server is performed by a port conversion unit 22-1 of FIG. 2 described later. As a result, the proxy server A (7) and the proxy server B (8) are exchanged. When the present time is outside the time stored in the time period management table 224-2 of FIG. 5 described later, the port change of the proxy server is not performed.

The proxy server A (7) and the proxy server B (8) are different from each other in the restriction of the HTTP, and the restriction of the HTTP can be performed by selecting the proxy server B (8).

On the other hand, in the case where the user terminal is the port change user and does not know the address of the proxy server, the time period management table 224-2 of FIG. 5 described later and the present time of the access server 6 are compared, and when the present time is within the time stored in the time period management table 224-2 of FIG. 5 described later, the port change of the router connected to the access server is performed by the port change unit 22-1 of FIG. 2 described later. As a result, the router A (10) and the router B (15) are exchanged. When the present time is outside the time stored in the time period management table 224-2 of FIG. 5 described later, the port change is not performed.

The router A (10) and the router B (15) are different from each other in filtering, and the router B (15) cooperates with the DNS server and can perform the restriction of the HTTP. The restriction of the HTTP can be performed by selecting the router B (15) by the port change.

Besides, in the case of the user for which the port filtering is performed, the time period management table 224-2 of FIG. 5 described later and the present time of the access server are compared, and when the present time is within the time stored in the time period management table 224-2 of FIG. 5 described later, the port filtering of the port at the user terminal side is performed by the filtering unit 22-2 described later in FIG. 2. After the execution of the port filtering, the port filtering is performed from the time period management table 224-2 of FIG. 5 until the timer in the timer circuit 24 described later in FIG. 2 is expired. When the present time is outside the set time stored in the time period management table 224-2, the port filtering is not performed.

By using the timer of the timer circuit 24 of FIG. 2 described later according to this embodiment, the restriction of the access time of the user terminal can be controlled also after the authentication.

Figure 2:
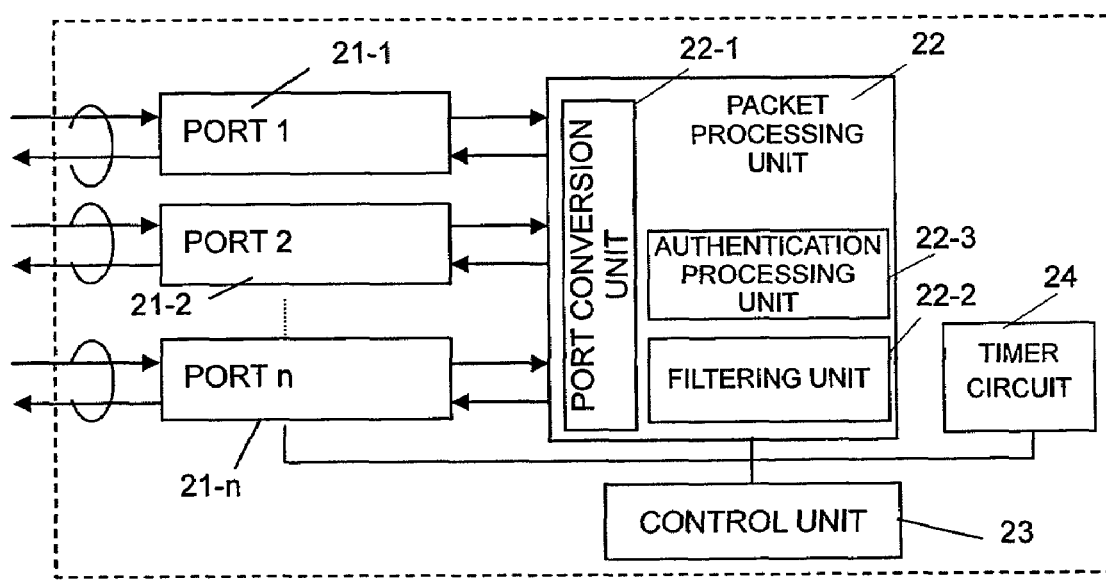
FIG. 2 is an apparatus structural view of an access server.

FIG. 2 is a block diagram showing the structure of the access server 6 of this embodiment.

The access server 6 includes, for example, plural input and output ports 21-1 to 21-*n*, a packet processing unit 22, a control unit 23 to control the port 21-*n*, and a timer circuit 24 to manage the packet processing unit 22 by time. Besides, the packet processing unit 22 includes the port conversion unit 22-1, the filtering unit 22-2, and an authentication processing unit 22-3.

The port 21 is an interface between the user terminal and the ISP network 9 or the like, and performs transmission and reception of packets (for example, packets at the time of execution of PPP session connection) to and from the plural user terminals and the communication network. The packet processing unit 22 performs a packet processing or the like based on the content of the packet received at the port 21, and makes an output to one of the ports 21. The port conversion unit 22-1 performs the change of a port, and the filtering unit 22-2 performs the filtering of a port. The authentication processing unit 22-3 communicates with the authentication server 14, and performs a processing for authentication of the user terminal. Incidentally, the packet processing unit 22 performs an appropriate process other than the port conversion, such as routing.

The control unit 23 performs the cooperative control of the packet processing unit 22 and the timer circuit 24. The timer circuit 24 starts and ends the timer in the packet processing unit 22. The timer circuit 24 manages, for example, the present time. Alternatively, the timer circuit 24 manages, for each of the user terminals, the time till the port change time, the time till the filtering start time, or the time till the filtering end time.

Figure 3:
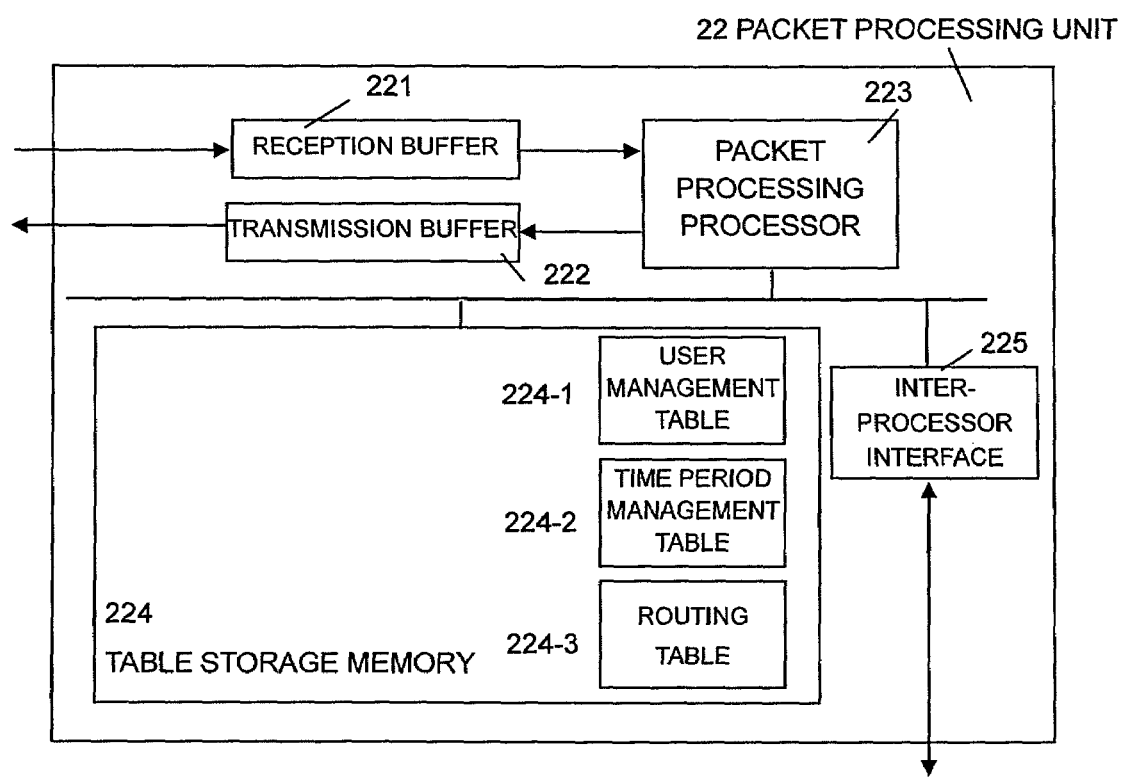
FIG. 3 is a structural view of a packet processing unit of the access server.

FIG. 3 is a detailed structural view of the packet processing unit 22.

The packet processing unit 22 includes, for example, plural reception buffers 221 to temporarily store packets from the ports 21-1 to 21-n, a packet processing processor 223 to read the packets from the reception buffer 221 and to perform a packet process or the like, a table storage memory 224 to store tables (a user management table 224-1, a time period management table 224-2, a routing table 224-3) to be read by the packet processing processor 223 at the time of execution, a transmission buffer 222 to temporarily store packets to the ports 21-1 to 21-n, and an inter-processor interface 225 as an interface to the control unit 23. Incidentally, the packet processing unit 22 may further include an HTTP data memory storing HTTP data. Here, the processor 223 reads the packet stored in the reception buffer, performs the packet process by the user management table 224-1, the time period management table 224-2, and the routing table 224-3, and then, makes an output to the transmission buffer 222 by the header information of the packet. Incidentally, the functions of the port conversion unit 22-1, the filtering unit 22-2, and the authentication processing unit 22-3 of FIG. 2 are executed by, for example, the packet processing processor 223.

Besides, in cooperation with the time period management table 224-2 of FIG. 5 described later and the timer circuit 24, the packet processing processor 223 compares the time stored in the user management table 224-1 of FIG. 4 described later with the present time of the access server. When the present time is within the set time, and when the terminal is the port change user, the packet processing processor 223 changes the port of the proxy server by the port conversion unit 22-1 through the control unit of FIG. 2. When the terminal is the port filtering user, the communication of the port of the user terminal is disconnected by the filtering unit 22-2.

Data Structure Example

FIG. 4 is a view showing a structural example of the user management table 224-1 of the access server 6.

In the user management table 224-1, for example, a user ID (user identifier) 2240-11 of the user terminal, a transmission source IP address 2240-12 as the address of the user terminal, a port number 2240-13 where the user terminal and the access server are connected, a PPP session ID 2240-14, a port change setting information 2240-15, a port filtering setting information 2240-16, and an object port number (output port number information) 2240-17 are made to correspond to one another and are stored.

In the user management table 224-1 of the access server 6, each time the PPPoE session and the PPP session including authentication completion are established, the PPP session ID 2240-14 and the transmission source IP address 2240-12 are updated. Besides, necessary information is extracted from the attribute pair 3000-16 of the authentication packet 300 of the authentication server of FIG. 7 described later, and it is stored whether the user terminal is the port change 2240-15 or the port filtering 2240-16. As a result, based on the transmission source IP address, the access server 6 outputs the object output port 2240-17 where the port change and the port filtering are performed.

FIG. 5 is a view showing a structural example of the time period management table 224-2 of the access server 6.

Figure 7:
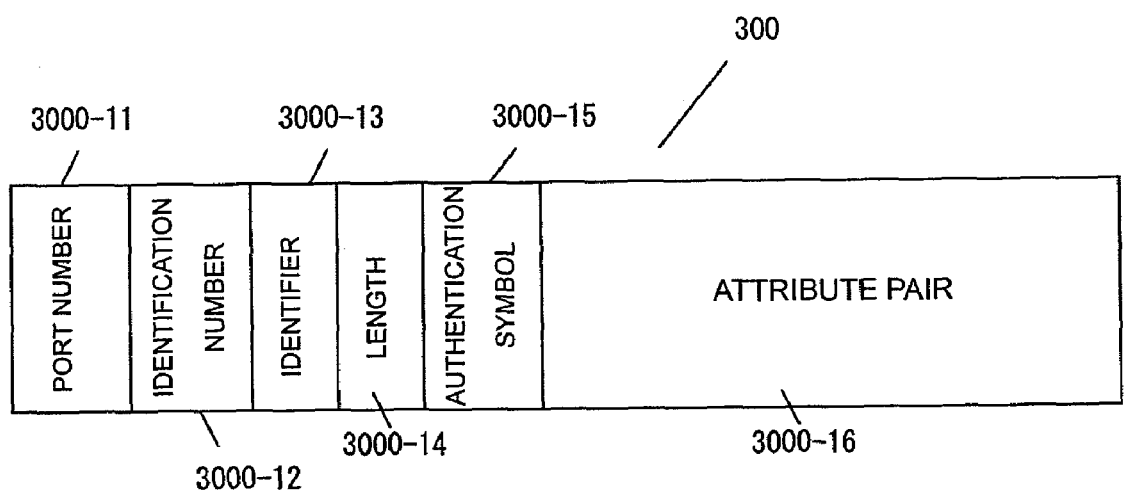
FIG. 7 is a structural example of an authentication packet of an authentication server.

In the time period management table 224-2 of the access server 6, for example, a user ID 2240-21 of the user terminal, a user terminal access time 2240-22 when the user terminal accesses the access server 6, an authentication completion time 2240-23 to store the time when Access Ack (Accept) is received from the authentication server 14, a port change start time (port change time) 2240-24 extracted from the attribute value pair 3000-16 of the authentication packet 300 of the authentication server of FIG. 7 described later and stored, a port change end time (port change time) 2240-25, a port filtering start time 2240-26, and a port filtering end time 2240-27 are made to correspond to one another and are stored. The time period management table 224-2 of the access server 6 extracts necessary information from the attribute value pair 3000-16 of the authentication packet 300 of the authentication server of FIG. 7 described later, and is updated each time the user terminal is authenticated.

FIG. 6 is a view showing a structural example of the routing table 224-3 of the access server 6.

In the routing table 224-3, for example, a destination IP address 2240-31, a next hop 2240-32, and a port number 2240-33 to output a packet are made to correspond to one another and are stored.

FIG. 7 is a view showing the structure of the authentication packet 300 transmitted and received between the authentication server and the access server.

The authentication packet 300 includes a port number 3000-11, an identification number 3000-12, an identifier 3000-13, a length 3000-14, an authentication symbol 3000-15, and an attribute pair 3000-16.

The port number 3000-11 indicates the port number (for example, #9) of the authentication server. The identification number (type number) 3000-12 indicates that the authentication packet is one of Access-Request (authentication request), Access-Accept (access permission) and Access-Reject (access reject). The identifier 3000-13 is used to differentiate among plural requests. The length 3000-14 indicates the length of the packet. The authentication symbol 3000-15 is used to prevent falsification of data.

The attribute value pair (attribute pair) includes information to be stored in the user management table 224-1 of FIG. 4. For example, the attribute value pair includes the information of the user ID 2240-11, the port change setting information 2240-15 for the user terminal, the port filtering setting information 2240-16, the port change start time 2240-24, the port change end time 2240-25, the port filtering start time 2240-26, and the port filtering end time 2240-27, and the information is transferred between the access server 6 and the authentication server 14.

Figure 24:
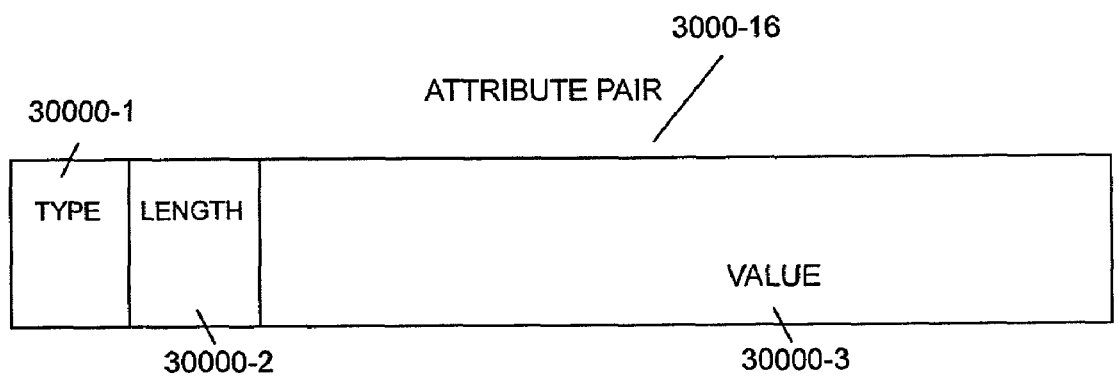
FIG. 24 is an explanatory view of an attribute value pair.

FIG. 24 is an explanatory view of the attribute value pair.

The attribute value pair includes, for example, a Type (type) 30000-1, a Length (length) 30000-2, and a Value (value, information) 30000-3.

The Type 30000-1 indicates which information, such as IP address or password, is included in the Value 30000-3. The Length 30000-2 indicates the length of the attribute pair. The Value 30000-3 includes the information of the IP address, the password or the like. Incidentally, the authentication packet 300 shown in FIG. 7 can include plural attribute pairs of FIG. 24.

The content of the packet is changed according to the Type of the attribute pair. For example, in the case where the Type indicates the password, the password (which may be encrypted) enters the Value. In this embodiment, the authentication packet 300 at process 1108 and 1110 of FIG. 11-1 described later corresponds to this. Also with respect to the presence or absence of the port change or the port filtering, the Type includes an item of "filtering", and a value (for example, 1, 0) corresponding to the presence or absence enters the Value. In the example of FIG. 24, type: x indicates the port change, and type: y indicates the filtering.

Incidentally, as the structure of the attribute pair of a Radius packet, a well-known one can be used, and the description of the designation of a bit width, the designation of the Length and the like will be omitted. Besides, for example, in the case of the password, it is determined that the type is 2, and this can be used, and when it is used by the vendor, it can be set uniquely, and therefore, in this embodiment, as an example, x is assigned to the port change, and y is assigned to the port filtering.

FIG. 8 is a view showing a structure of an authentication server management table 400-1 of the authentication server.

The authentication server management table 400-1 includes, for example, for each user, a user ID 4000-1, a Password (password) 4000-2, a port change setting information 4000-3, a port change start time 4000-4, a port change end time 4000-5, a port filtering setting information 4000-6, a port filtering start time 4000-7, and a port filtering end time 4000-8. The authentication management table 400-1 of the authentication server previously has the user information such as the user ID and the password.

Besides, the respective information stored in the authentication server management table can be previously set. For example, the user gives notice to the authentication server 14 or the administrator of the ISP, and the setting can be previously performed at the ISP side. In the example of FIG. 8, although the port change time and the filtering time are the same time, they may be made different for each user.

OPERATION EXAMPLE 1

Hereinafter, the operation of this embodiment will be described in detail.

An operation example 1 is an operation example of a case where an access is made by the terminal A (1) which is neither the port change user nor the port filtering user.

Figure 9:
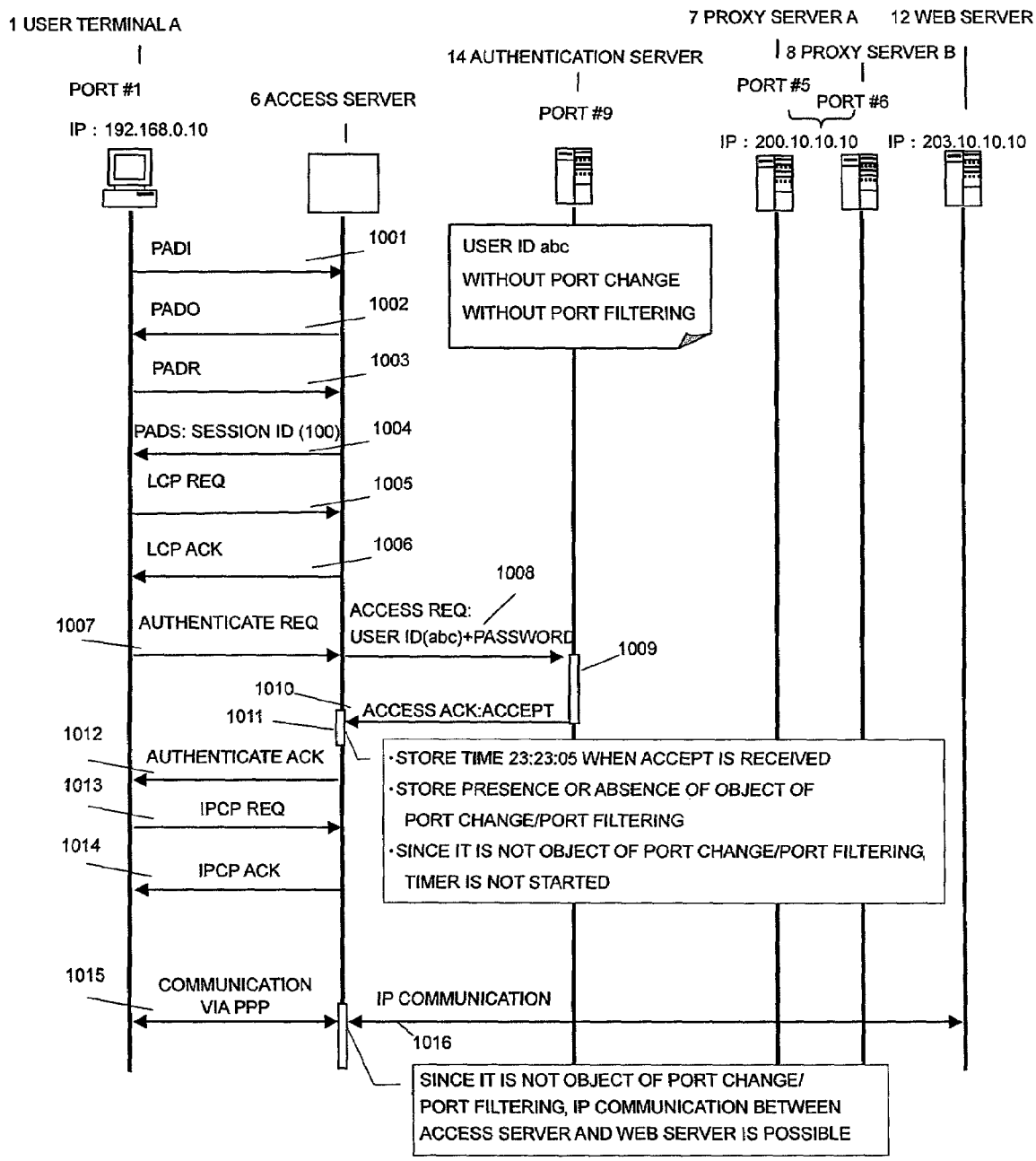
FIG. 9 is an operation sequence view of the access server in an operation example 1.
Figure 10:
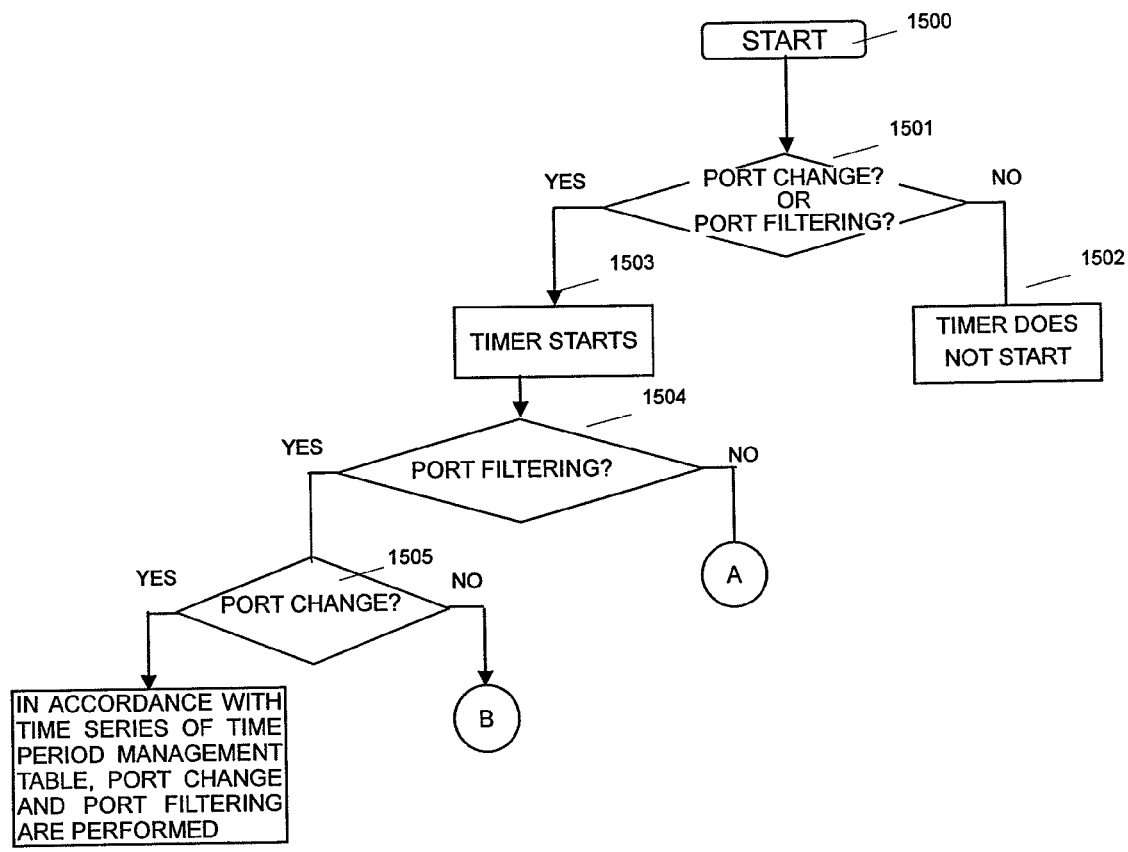
FIG. 10 is a flowchart of a timer circuit.

FIG. 9 is a sequence view showing the operation of this operation example. FIG. 10 is a flowchart showing the operation of the timer circuit 24 in this operation example.

In the process of FIG. 9, as shown in FIG. 1, the access server 6 is connected with the client terminal A (1) (access server port number #1) through the access network 5, the authentication server 14 (access server port number #4), the proxy server A (7) (access server port number #5), the proxy server B (8) (access server port number #6), and the web server 12 through the ISP network 9 (access server port number #7), the router A 10 and the Internet 11. The access network 5, the ISP network 9, since the router A (10) and the Internet 11 are used in all examples, they are omitted in FIG. 9. Here, a description will be made under the assumption that an IP address (192:168: 0:10/32) is assigned to the user terminal A (1).

First, a PPPoE session is established between the user terminal A (1) and the access server 6. For example, in order to start the sequence of PPP, PADI (PPP Active Discovery Initiation) is transmitted from the user terminal A (1) to the access server 6 by using the PPPoE protocol (step 1001). The access server 6 transmits PADO (PPP Active Discovery Offer) (step 1002). In response to this, the user terminal A (1) transmits PADR (PPP Active Discovery Request) to the access server 6 (step 1003). The access server 6 transmits PADS (PPP Active Discovery Session) (step 1004). When the PPPoE is established, a PPP session ID is determined. In this example, the PPP session ID between the terminal A (1) and the access server 6 is 100. The access server 6 stores the determined PPP session ID into the PPP session ID 2240-14 of the user management table 224-1. Besides, the access server 6 stores the transmission source IP address (IP address of the terminal: 192.168.0.10) and the port number (#1) to which the terminal is connected into the user management table 224-1 at an appropriate timing.

After the PPPoE is established, a serial link is established by using LCP (Link Control Protocol). For example, the user terminal A (1) transmits LCP Req (LCP Request) to the access server 6 (step 1005). The access server 6 transmits LCP Ack (step 1006).

After the LCP is established, the authentication protocol is used to establish the connection among the user terminal A (1), the access server 6 and the authentication server 14. The user terminal A (1) transmits Authenticate Req (authenticate request) to the access server 6 (step 1007). The Authenticate Req includes, for example, the user ID and the password. Incidentally, the access server 6 may store the user ID into the user management table 224-1 at an appropriate timing. Besides, the access server 6 stores the user ID and the user terminal access time into the time period management table 224-2.

The access server 6 transmits the authentication packet 300 to the authentication server 14 (step 1008). For example, the user ID and the password received from the terminal A (1) are included in the attribute pair 3000-16 of the authentication packet 300 and are transmitted to the authentication server 16.

In response to this, the authentication server 14 authenticates the user ID (abc) and the Password from the attribute pair 3000-16 of the authentication packet 300 (step 1009). For example, the user ID and the password in the authentication packet 300 are respectively compared with the user ID 4000-1 and the password 4000-2 in the authentication server management table 400-1. When the user ID and the Password are correct (both are coincident), the authentication server 14 causes the identification number 3000-12 of the packet 300 to become a value corresponding to Access-Accept (access accept), and transmits the packet (Access-Accept) (step 1010). Here, the authentication server 14 causes the attribute pair 3000-16 of the authentication packet 300 to include the respective information of the port change setting information 4000-3, the port change start time 4000-4, the port change end time 4000-5, the port filtering setting information 4000-6, the port filtering start time 4000-7, and the port filtering end time 4000-8 of the authentication server management table 400-1 and transmits it to the access server 6. Incidentally, as shown in FIG. 8, with respect to an item in which there is no data, it may not be included in the attribute pair 3000-16. On the other hand, when the user ID and the password are not correct, the identification number 3000-12 of the authentication packet 300 is made a value indicating the access reject, and is transmitted to the access server 6.

When receiving the authentication packet 300 indicating Access-Accept, from the attribute pair 3000-16 the access server 6 stores the port change 2240-15 or the port filtering 2240-16 into the user management table 224-1 of the access server 6. More specifically, the access server 6 stores the port change setting information and/or the port filtering setting information of the attribute pair 3000-16 into the user management table 224-1. In this example, neither of them has data (or OFF). The time period management table 224-2 stores the authentication server authentication completion time 2240-23 (in this example, 23:23:05) when the Access-Accept is received, the port change start time 2240-24 (nothing in the operation example 1) extracted from the attribute pair 3000-16, the port change end time 2240-25 (nothing in the operation example 1), the port filtering start time 2240-26 (nothing in the operation example 1), and the port filtering end time 2240-27 (nothing in the operation example 1). Besides, when the terminal is the port change user or the port filtering user, the timer of the timer circuit 24 is started. Incidentally, in the operation example 1, since the terminal is neither the port change user nor the port filtering user, the timer circuit 24 does not start (step 1011 and steps 1500 to 1502 of FIG. 10).

After step 1011, the access server 6 transmits Authenticate Ack (Authenticate Ack) to the user terminal A (1) (step 1012).

Next, the network layer is set and established using IPCP (Internet Protocol Control Protocol). The user terminal A (1) transmits IPCP Req (IPCP Request) to the access server 6 (step 1013). The access server 6 transmits IPCP Ack (step 1014). By this, PPP session connection is completed between the user terminal A (1) and the access server 6, and the IP address of the user terminal A (192.168.0.10/32) is established (step 1015).

Based on the information of the user management table 224-1, the access server 6 is connected with the ISP network 9 in accordance with the routing table 224-3 (192.168.0.10 to 201.10.10.10) since the terminal is neither the port change user nor the port filtering user. For example, a packet to the web server 12 from the user terminal A (1) is outputted from port number 7 in accordance with the routing table 224-3. As a result, IP communication (1016) between the access server 6 and the Web server 12 becomes possible, and consequently, the user terminal A (1) can perform IP communication with the Web server 12.

OPERATION EXAMPLE 2

Next, an operation example 2 of this embodiment will be described. The operation example 2 is the operation example of a case where the terminal B (2), which is the port change user and is not the port filtering user, makes an access.

Figure 11:
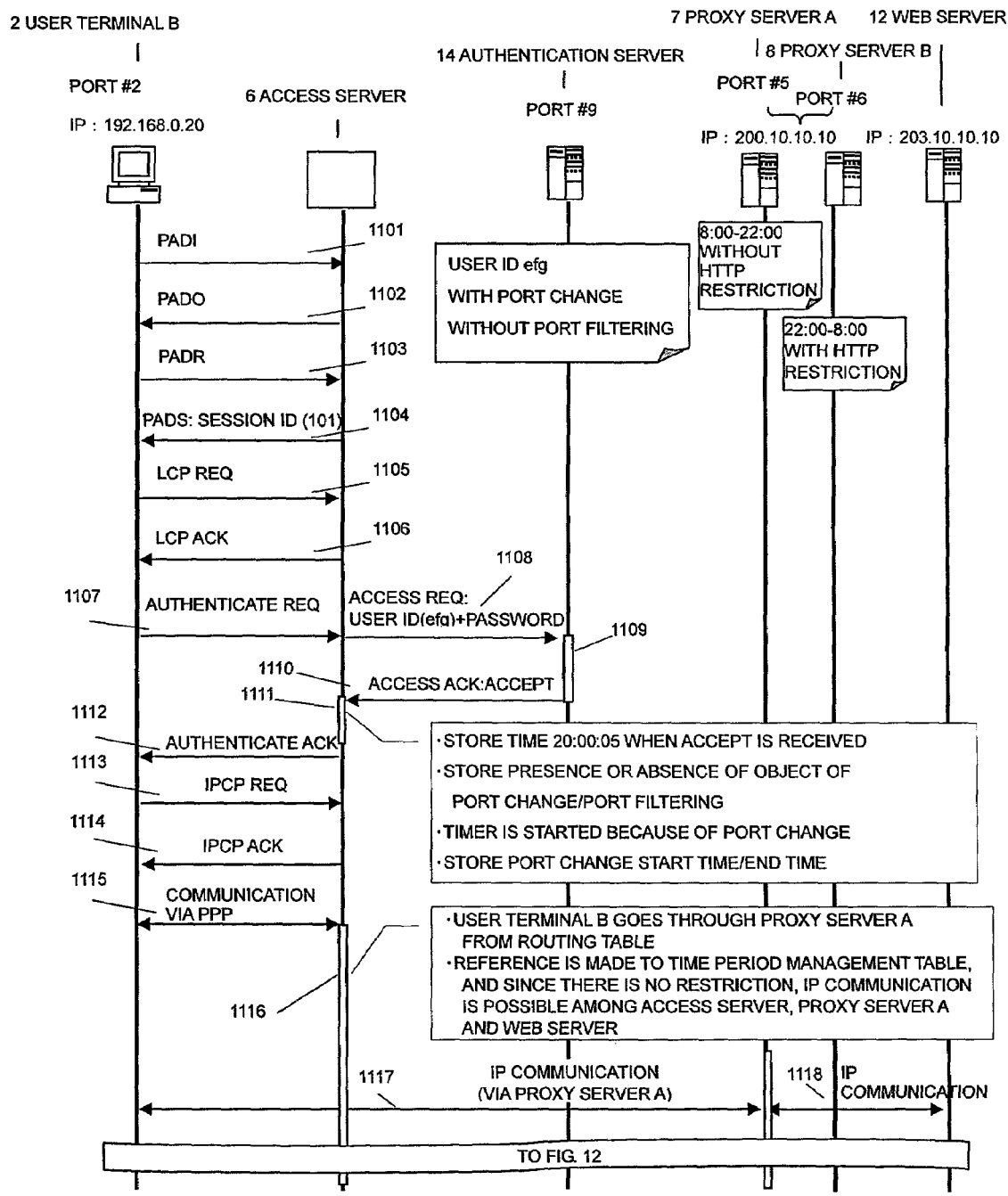
FIG. 11 is an operation sequence view (1) of the access server in an operation example 2.
Figure 12:
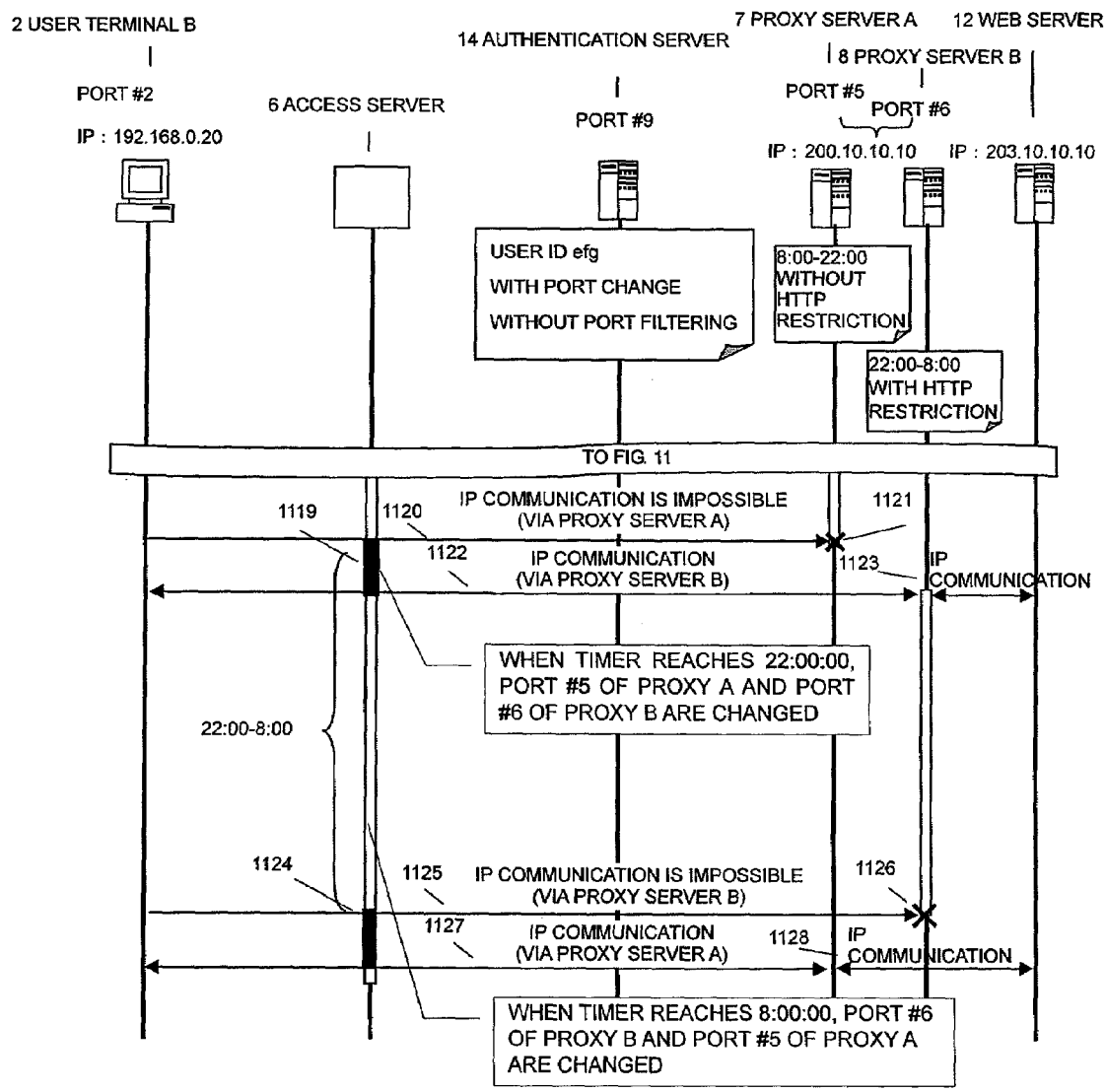
FIG. 12 is an operation sequence view (2) of the access server in the operation example 2.
Figure 13:
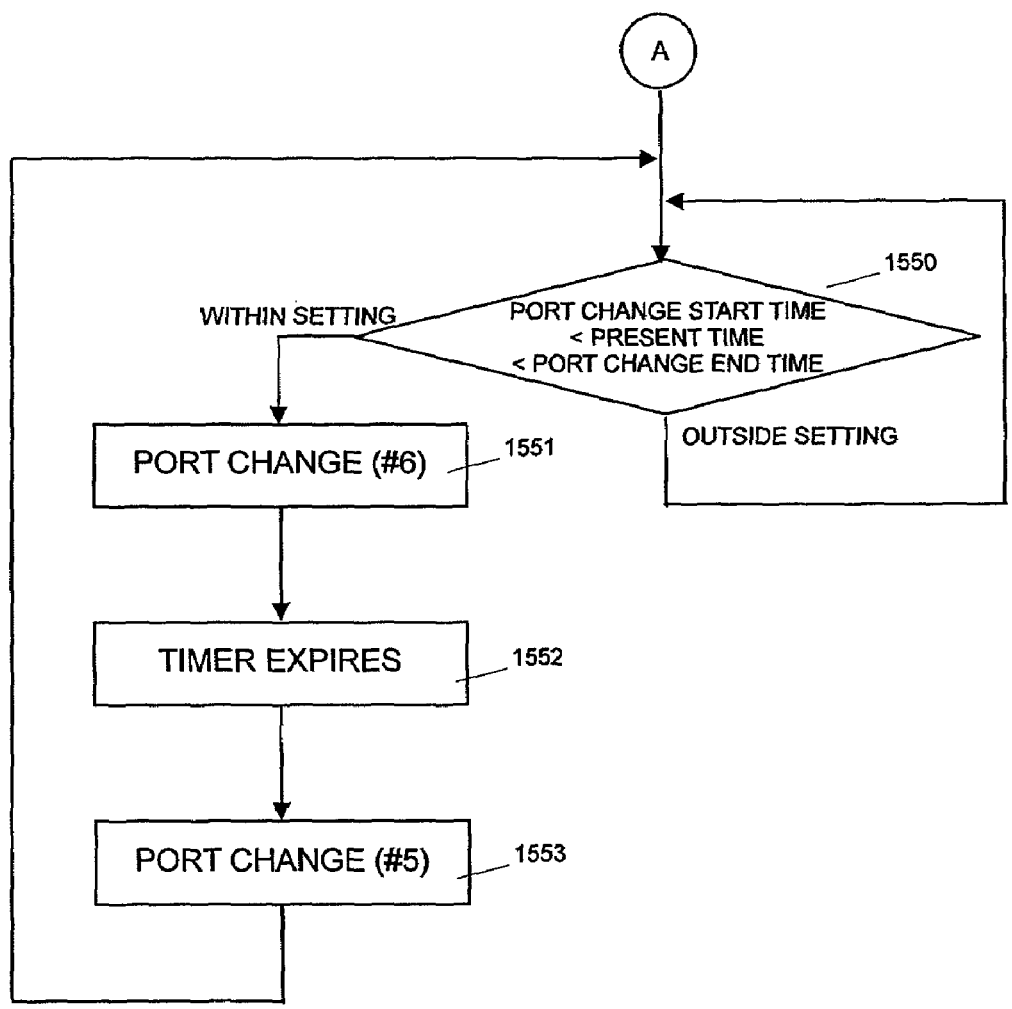
FIG. 13 is a flowchart of a timer circuit in the operation example 2.

FIG. 11 and FIG. 12 are sequence views (1) and (2) of the operation example 2. FIG. 13 is a flowchart of the timer circuit 24 indicating the operation of the operation example 2. FIG. 14 and FIG. 15 are explanatory views of the user management table in the operation example 2.

FIG. 11 shows the operation of the user terminal B (2), the access server 6, the authentication server 14, the proxy server A (7), the proxy server B (8), and the Web server 12. Incidentally, it is assumed that the terminal B (2) knows the IP address (200.10.10.10) of the proxy server A (7) and the proxy server B (8) and it is appropriately stored.

Since steps 1101 to 1110 of FIG. 11 are similar to steps 1001 to 1010 of FIG. 9, the description of steps 1101 to 1110 will be omitted. Incidentally, at step 1110, the attribute pair 3000-16 of the authentication packet 300 includes the port change setting information (ON in this example) 4000-3 corresponding to the user ID (efg), the port change start time (22:00 in this example) 4000-4, and the port change end time (8:00 in this example) 4000-5. Further, although the port filtering setting information 4000-6, the port filtering start time 4000-7, and the port filtering end time 4000-8 may be included, since there is no data in this example, they may be omitted.

When receiving the authentication packet 300, similarly to the operation example 1, the access server 6 stores the respective information into the user management table 224-1 of the access server 6 from the attribute pair 3000-16. For example, the port change setting information and/or the filtering setting information is stored. Since the user terminal B (2) is the port change user differently from the operation example 1, ON is stored in the port change setting information 2240-15.

Since the terminal is the port change user (since the port change setting information is ON), the port number (#7) of the access server connected to the ISP network 9 is stored in the object port number 2240-17 of the user management table 224-1.

Besides, the time period management table 224-2 stores the authentication server authentication management time 2240-23 (20:00:05 in this example) when Access-Accept is received, the port change start time 2240-24 (22:00), and the port change end time 2240-25 (8:00). Here, since the terminal is the port change user, the timer of the timer circuit 24 is started (step 1111 of FIG. 11, steps 1503 to 1504 of FIG. 10: No, and step 1550 of FIG. 13).

The access server 6 receives step 1111, and transmits Authenticate Ack to the user terminal B (2) (step 1112).

The network layer is set and established by using IPCP. The user terminal B (2) transmits IPCP Req to the access server 6 (step 1113). The access server 6 transmits IPCP Ack (step 1114). By this, PPP session connection is completed between the user terminal B (2) and the access server 6, and the IP address of the user terminal B (192.168.0.20/32) is established (step 1115).

The user terminal B2 previously knows the IP address of the proxy server 7, 8, and when accessing the web, the terminal accesses, for example, the proxy server A 7 through the access server 6. The access server 6 outputs a packet, in accordance with the routing table 224-3, to the port 5 to which the proxy server A 7 is connected. Besides, the access server 6 causes the port number (#5) to correspond to the user identifier (efg) and stores it into the object port number 2240-17 of the user management table 224-1. Hereinafter, irrespective of the routing table 224-1, the access server 6 refers to the object port number 2240-17 of the user management table 224-1 and may determine the output destination port of the packet from the user terminal B (2).

When the PPP session between the user terminal B (2) and the access server 6 is established, the access server 6 compares the present time of the access server, the port change start time 2240-24 (22:00) of the time period management table 224-2, and the port change end time 2240-25 (8:00).

For example, in this example, the time is before the restriction time, and in accordance with the object port number (#5) 2240-17 of the user management table 224-1, communication is started with the proxy server A (7) of IP address 200.0.0.10 connected to the port number #5 of the access server 6 (step 1116). The IP communication between the access server 6 and the Web server 12 goes through the proxy server A (7) from step 1116 (step 1117), and the proxy server A (7) and the Web server 12 make IP communication (step 1118), so that the IP communication between the user terminal B (2) and the Web server 12 becomes possible. Incidentally, the communication between the proxy server A (7) and the Web server 12 may go through, for example, the access server 6. Since the restriction of the HTTP is not provided for the proxy server A (7) for daytime, the access to the Web can be freely performed till 22:00.

After the timer of the timer circuit 24 is started, when it becomes the port change start time 2240-24 (22:00) of the time period management table 224-2, by the time period management table 224-2, the object port number 2240-17 of the user management table 224-1 is changed from the port number #5 of the access server to the previously determined port number #6 (step 1119 of FIG. 12, step 1551 of FIG. 13, and FIG. 14). After the conversion, the change to the port #6 of the proxy server B (8) connected to the access server 6 is performed by the port conversion unit 22-1, so that the IP communication becomes impossible between the user terminal B (2) and the Web server 12 (step 1120 and step 1121).

On the other hand, the IP communication becomes possible between the user terminal B (2) and the Web server 12 through the proxy server B (8).

By the change to the proxy server B (8), although the IP communication between the user terminal B (2) and the Web server 12 is kept, the restriction is provided in the HTTP, and what satisfies the restriction condition of the HTTP can not be displayed.

When the timer is expired (step 1552 of FIG. 13) by the port change end time 2240-25 of the time period management table 224-2 of FIG. 8, the object port number 2240-17 of the user management table 224-1 is converted from the port number #6 of the access server to the port number #5 (step 1124, step 1553 of FIG. 13, and FIG. 15). After the conversion, the change to the port number #5 of the proxy server A connected to the access server 6 is performed by the port conversion unit 22-1, so that the IP communication becomes impossible between the user terminal B (2) and the Web server 12 through the proxy server B (8) (step 1125 and step 1126). Instead of this, the IP communication becomes possible between the user terminal B (2) and the Web server 12 through the proxy server A (7) (step 1127 and 1128). Since the proxy server B (8) is changed to the proxy server A (7), the restriction of the HTTP can be released.

By the above process, it is possible to provide the control function to control the browsing time of the HTTP of the user terminal according to the time period after the authentication execution of the authentication server.

OPERATION EXAMPLE 3

An operation example 3 of this embodiment will be described. The operation example 3 is the operation example of a case where the terminal C (3), which is not a port change user but a port filtering user, makes an access.

Figure 16:
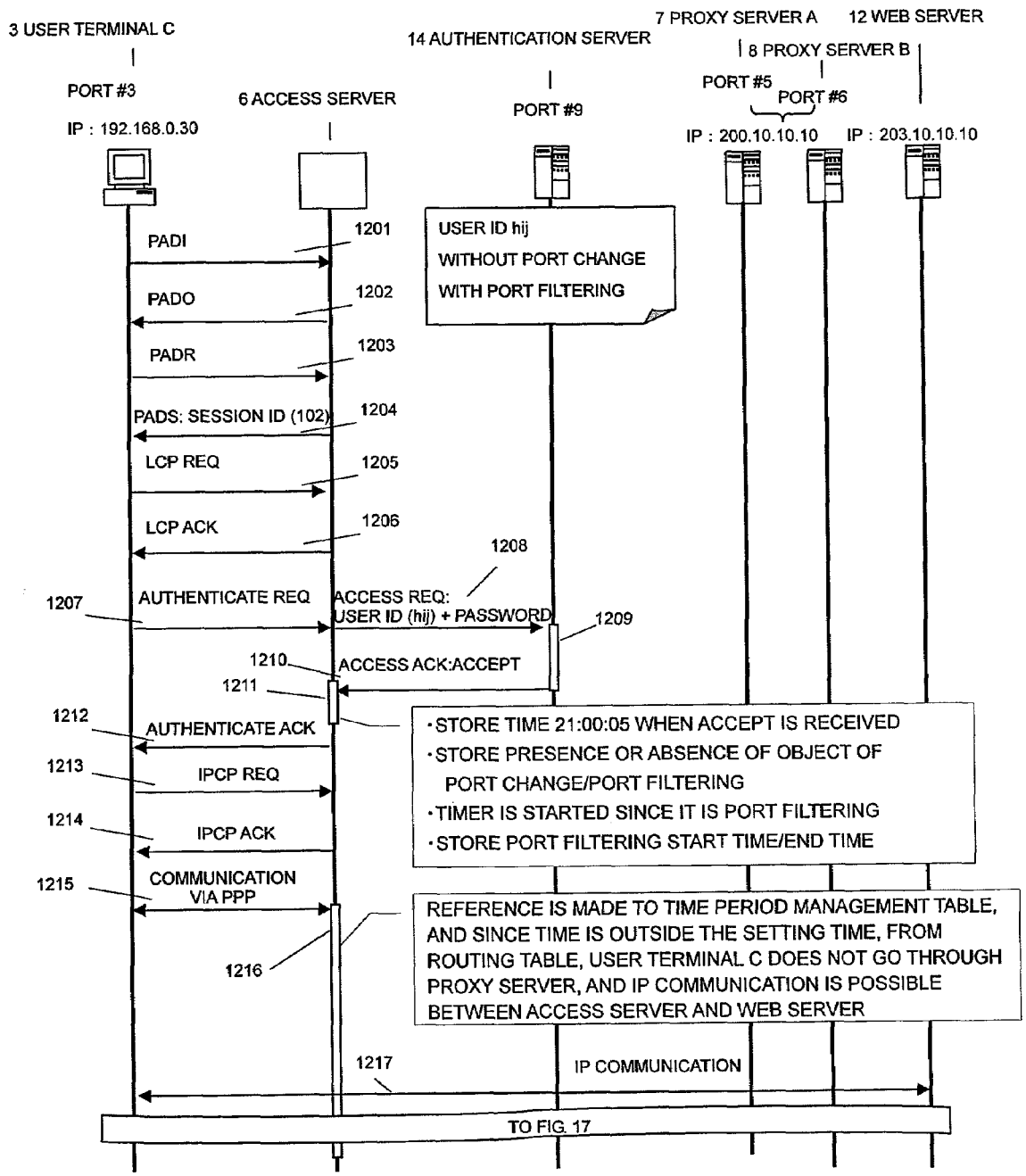
FIG. 16 is an operation sequence view (1) of the access server in an operation example 3.
Figure 17:
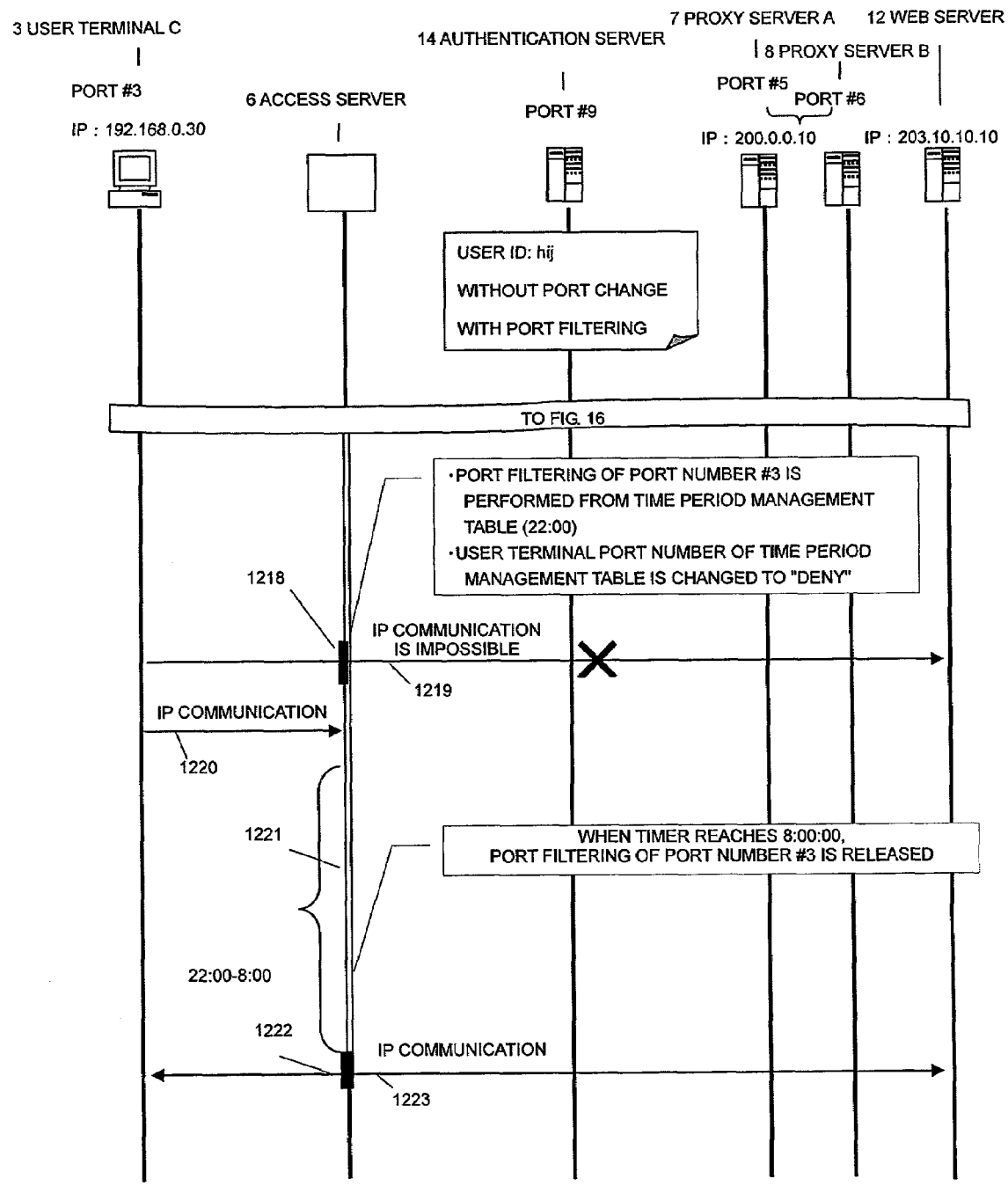
FIG. 17 is an operation sequence view (2) of the access server in the operation example 3.
Figure 18:
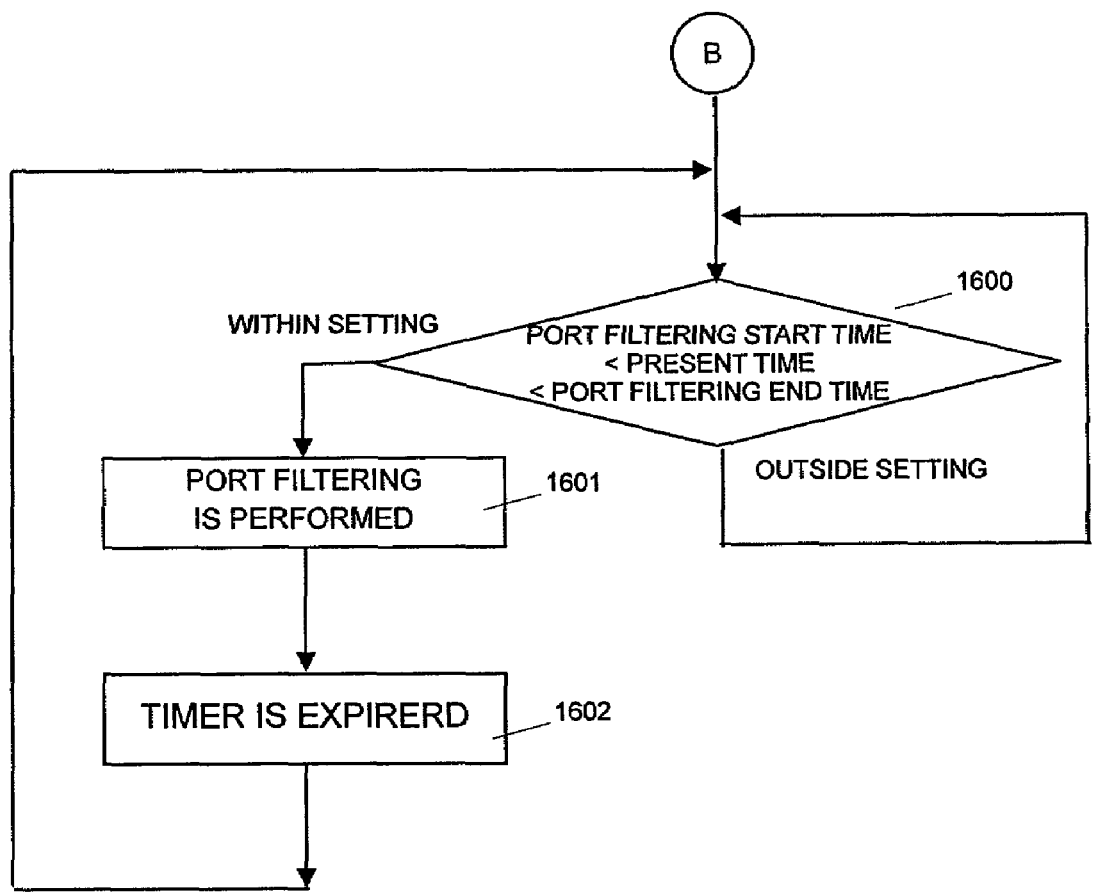
FIG. 18 is a flowchart of the timer circuit in the operation example 3.

FIG. 16 and FIG. 17 are sequence views (1) and (2) of the operation example 3. FIG. 18 is a flowchart of the timer circuit 24 showing the operation in the operation example 3. FIG. 19 is an explanatory view of the user management table in the operation example 3. FIGS. 16 and 17 show the operation of the user terminal C (3), the access server 6, the authentication server 14 and the Web server 12.

Since steps 1201 to 1215 of FIG. 15 are similar to steps 1101 to 1115 of FIG. 11, the description of steps 1201 to 1215 will be omitted.

However, in this example, the attribute pair 3000-16 of the packet 300 transmitted to the access server 6 based on the authentication server management table 400-1 of the authentication server 14 is different from that of the operation example 2 and indicates the port filtering user (step 1211 and step 1505 of FIG. 10). For example, at step 1210, the attribute pair 3000-16 of the authentication packet 300 includes the port filtering setting information (ON in this example) 4000-6 corresponding to the user ID (hij), the port filtering start time (22:00 in this example) 4000-7, and the port filtering end time (8:00 in this example) 4000-8. Further, although the port change setting information 4000-3, the port change start time 4000-4, and the port change end time 4000-5 may be included, they may be omitted since there is no data in this example. Differently from the operation example 2, since the user terminal C (3) is the filtering user, ON is stored in the port filtering setting information 2240-16 of the user management table 224-1.

When the PPP session between the user terminal C (3) and the access server 6 is established, the access server 6 compares the present time of the access server with the port filtering start time 2240-26 (22:00) of the time period management table 224-2 and the port filtering end time 2240-27 (8:00) (step 1216, step 1600 of FIG. 18).

For example, in this example, since the time is before the restriction time, the terminal is connected to the ISP network 9 in accordance with the routing information (192.168.0.30/ 32 to 201.10.10.10) of the routing table 224-3 of FIG. 6, and consequently, IP communication becomes possible between the user terminal C (3) and the Web server 12 (step 1217). Similarly to the foregoing operation example 1, an access can be freely made to the Web server.

After the time of the timer circuit 24 is started, when it becomes the port filtering start time 2240-26 (22:00) of the time period management table 224-2, the user terminal port number 2240-13 of the user management table 224-1 is changed to "deny" (see FIG. 17). Incidentally, appropriate information other than "deny" may be stored. Since the user terminal port number 2240-13 of the user management table 224-1 is "deny", the access server 6 performs the port filtering on the port number #3 of the access server 6 connected to the user terminal C (3) by the filtering unit 22-2 (step 1218, step 1601 of FIG. 18), and the IP communication between the user terminal C (3) and the Web server 12 (step 1220) is made impossible. Incidentally, the filtering unit 22-2 filters at least the packet on Web browsing, and may not filter a mail and/or a music file.

After the port filtering is executed, the port filtering is performed from the port filtering end time 2240-27 (8:00) of the time period management table 224-2 to the time when the timer of the timer circuit 24 is expired (step 1221).

When it becomes 8:00 when the timer is expired (step 1602 of FIG. 18), the user terminal port number 2240-13 of the user management table 224-1 is returned to the original port number #3. By this, the port filtering of the port number #3 (2240-13) connected to the user terminal C (3) is released from the user management table 224-1 (step 1222), and hereinafter, the IP communication (step 1223) between the access server 6 and the Web server 12 is established, and the IP communication between the user terminal C (3) and the Web server 12 becomes possible.

OPERATION EXAMPLE 4

Next, an operation example 4 of this embodiment will be described. The operation example 4 is the operation example of a case where the user terminal D, which is the port change user and is not the port filtering user, makes an access. Incidentally, this example is different from the operation example 2 in that the terminal D does not know the address of the proxy server.

Figure 20:
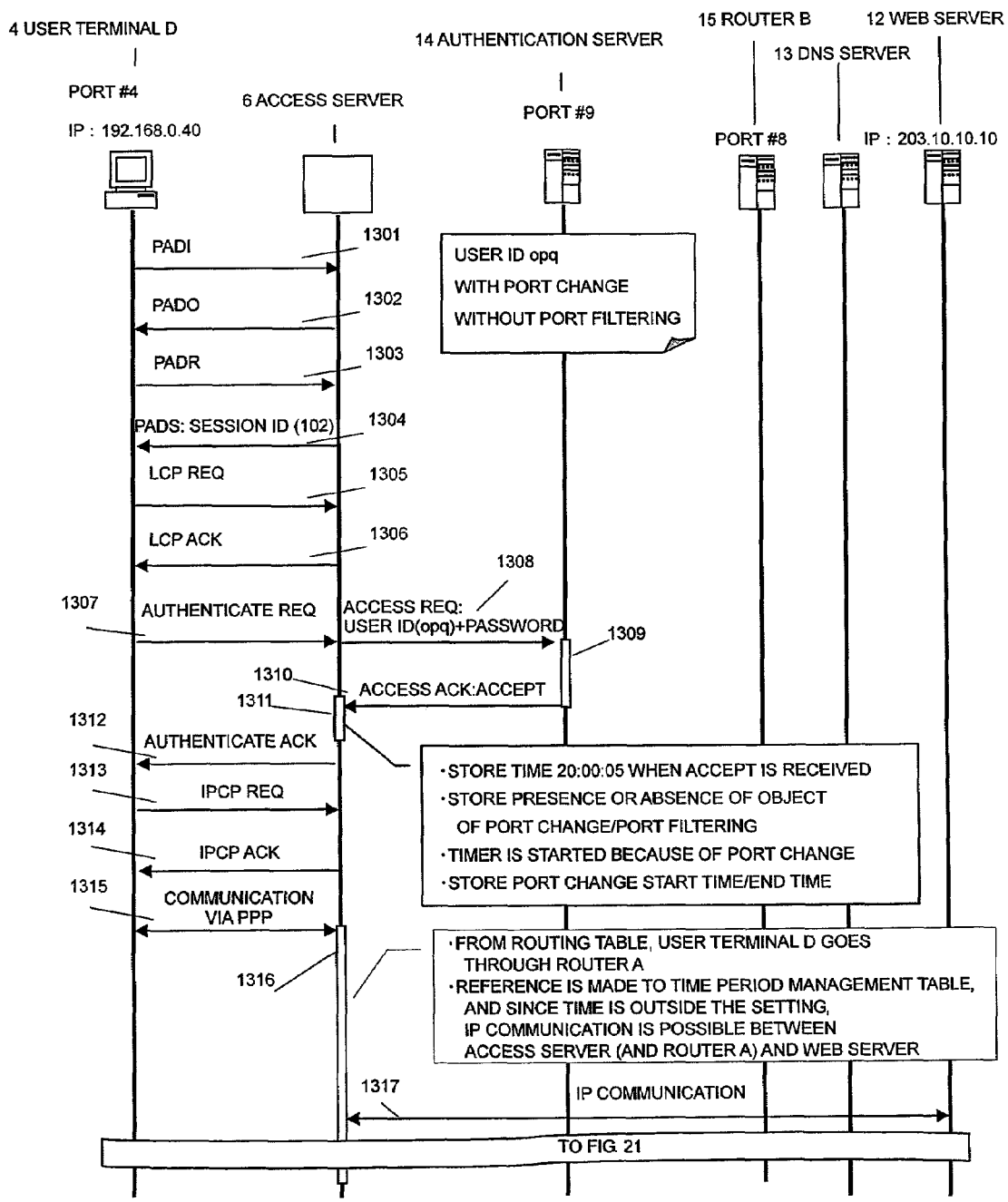
FIG. 20 is an operation sequence view (1) of the access server in an operation example 4.
Figure 21:
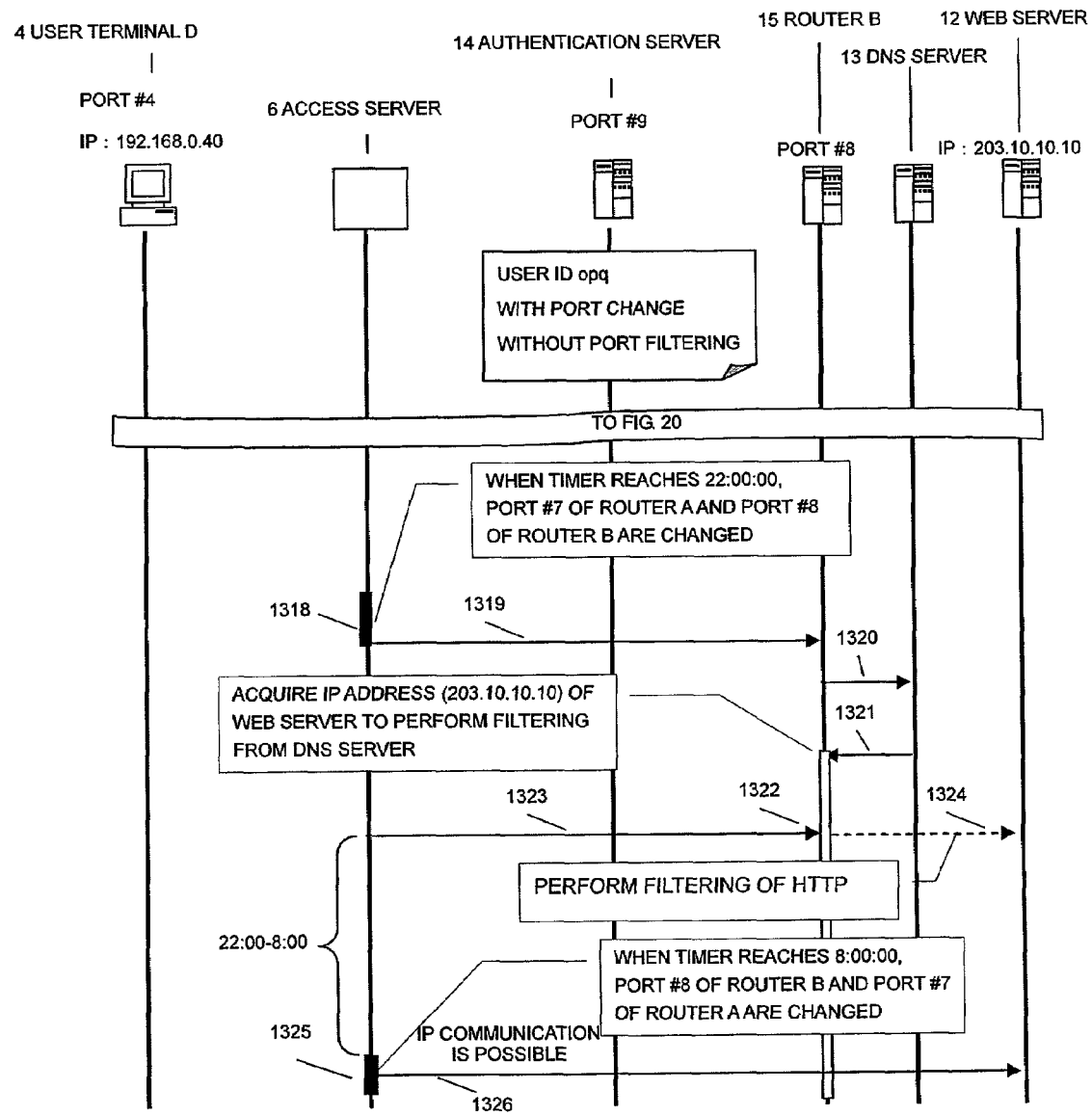
FIG. 21 is an operation sequence view (2) of the access server in the operation example 4.

FIGS. 20 and 21 are sequence views of the operation example 4. FIG. 22 is a user management table before the port change (port #8) in the operation example 4. FIG. 23 is a user management table after the port change (#7) in the operation example 4.

FIGS. 20 and 21 show the operation of the user terminal D (4), the access server 6, the authentication server 14, the router B (15), and the Web server 12. Here, it is assumed that the user terminal D (4) does not previously know the address of the proxy server.

Besides, since steps 1301 to 1315 of FIG. 20 are similar to the foregoing steps 1101 to 1115 (or the corresponding process in FIG. 9, FIG. 16) of FIG. 11 for PPP session establishment, the description will be omitted. Further, the description of the router A (10) will also be omitted.

Since the user terminal D (4) is the port change user, the timer of the timer circuit 24 has already been started, and when the PPP session between the user terminal D (4) and the access server 6 is established, the access server 6 compares the present time of the access server with the port change start time 2240-24 (22:00) of the time period management table 224-2 and the port change end time 2240-25 (8:00) (step 1316).

For example, in this example, since it is assumed that the time is before the set time, in accordance with the routing information of the routing table 224-3 of FIG. 6, the IP communication with the Web server 12 is started through the router A (10) connected with the port number #7 of the access server 6 (step 1317).

After the timer of the timer circuit 24 is started, when it becomes the port change start time 2240-24 (22:00) of the time period management table 224-2, the object port number 2240-17 of the time period management table 224-2 is converted from the port number #7 of the access server to a previously determined port number #8 (see FIG. 22). After the conversion, the change to the port #8 of the access server 6 is performed by the port conversion unit 22-1 (step 1318). After the change, the communication route is provided between the access server 6 and the router B (15) (step 1319) and between the DNS server (13) and the Web server 12, however, since the router B (15) does not have information of the IP address where the filtering (here, it is temporarily restricted to the HTTP) to the Web server 12 is to be performed, an inquiry is made to the DNS server (13) about the IP address of the Web server 12 (step 1320). After the inquiry, the DNS server sends back the IP address (203.10.10.10) of the Web server 12 to the router B (15) (step 1321). The router B (15) sets the filtering on the IP address (203.10.10.10) With respect to the execution of the filtering in the router B (15), a well-known technique can be used, however, no restriction is made to this embodiment. As a result, although the IP communication (step 1323) between the user terminal D (4) and the Web server 12 can be kept, the restriction is provided in the HTTP by the router B (15) (step 1322), and what satisfies the restriction condition of the HTTP can not be displayed (step 1324).

When the timer is expired by the port change end time 2240-25 (8:00) of the time period management table 224-2, the port number of the object port number 2240-17 of the user management table 224-1 is converted from the port number #8 of the access server to the original port number #7 (FIG. 20).

After the conversion, the port conversion unit 22-1 performs the change to the port #7 of the router A connected to the access server 6 (step 1325), so that the IP communication becomes possible between the access server 6 and the Web server 12 through the router A (10) (step 1326). The router B (15) is changed to the router A(10), so that the restriction of the HTTP can be released.

By the above process, it is possible to provide the control function to restrict the browsing time of the HTTP of the user terminal according to the time period after the authentication execution of the authentication server.

The present invention can be used in, for example, a network receiving an access from a user terminal.

What is claimed is:

1. An access server in a network system including an authentication server, a first server or a first communication apparatus to perform a first access restriction or not to perform the access restriction to an access from a user terminal to a site, a second server or a second communication apparatus to perform a second access restriction which is different from the first access restriction to the access from the user terminal to the site, and the access server, the access server comprising:
  a plurality of ports for connection with the user terminal, the authentication server, the first server and/or the first communication apparatus, and the second server and/or the second communication apparatus;
  a port conversion unit to change, according to time information which are set in advance in the authentication server and which are received from the authentication server when performing a user authentication with the authentication server, an output destination port of a packet from the user terminal to one of the port to which the first server or the first communication apparatus is connected and the port to which the second server or the second communication apparatus is connected;
  a filtering unit to perform filtering on the port to which the user terminal is connected;
  an authentication processing unit to perform a process for authentication of the user terminal by communicating with the authentication server; and
  a memory to store port change setting information to indicate whether port change is performed for the user terminal, one or plural port change times for changing the output destination port of the packet, filtering setting information to indicate whether filtering is performed for the user terminal, a filtering start time and a filtering end time correspondingly to a user identifier,
wherein
  the authentication processing unit transmits an authentication request to the authentication server when an access is made from the user terminal, receives an authentication packet including an authentication result, the port change setting information, the port change time for changing the output destination port of the packet, the filtering setting information and a filtering time from the authentication server,
  the authentication processing unit stores the port change setting information, the port change time for changing the output destination port of the packet, the filtering setting information, the filtering start time and the filtering end time included in the authentication packet into the memory correspondingly to the user identifier,
  the port conversion unit refers to the memory, and in a case where the port change setting information is set to perform the port change on an arbitrary user identifier, when it becomes the corresponding port change time, the port conversion unit changes an output destination of a packet from the user terminal of the user identifier, and
  the filtering unit refers to the memory, and in a case where the filtering setting information for an arbitrary user identifier is set to perform the filtering, when it becomes the corresponding filtering start time, the filtering unit performs the filtering on the port to which the user identifier is connected.

2. The access server according to claim 1, wherein
the first and the second servers are proxy servers different from each other in a use condition of HTTP, and
the access server changes the output port of the packet from the user terminal to the plurality of proxy servers according to the time period by referring to the memory, and Web browsing of the user terminal can be restricted according to the time period.

3. The access server according to claim 1, wherein
the filtering unit refers to the memory, and starts the filtering on the port to which the user identifier is connected when it becomes the corresponding filtering start time, and ends the filtering when it becomes the filtering end time.

4. The access server according to claim 1, wherein
the filtering unit filters at least a packet on web browsing, and does not filter a mail and/or a music file.

5. The access server according to claim 1, wherein
the first and the second communication apparatuses are a first and a second routers, and the access server changes the output port of the packet to the router from the user terminal according to the time period by referring to the memory, and distributes, for each time period, the packet to the first router not to perform the filtering and the second router to perform the filtering in cooperation with a DNS server.

6. The access server according to claim 1, wherein the memory includes
a user management area in which the port change setting information and the filtering setting information are stored correspondingly to the user identifier, and
a time period management area in which the one or plural port change times, the filtering start time and the filtering end time are stored correspondingly to the user identifier.

7. The access server according to claim 1, wherein
the memory further stores, correspondingly to a user identifier, output port number information to indicate a port for outputting the packet from the user terminal indicated by the user identifier,
the port conversion unit changes the output port number information of the memory when it becomes the port change time, and
the port conversion unit determines the output destination of the packet received from the user terminal in accordance with the output port number information of the memory.

8. The access server according to claim 1, wherein
the user terminal to perform wired communication and/or the user terminal to perform wireless communication in at least a part is accommodated.

9. The access server according to claim 1, further comprising
a timer circuit to manage present time or, to manage a time till the port change time, a time till the filtering start time or, a time till the filtering end time.

10. A connection restriction method in a network system including an authentication server, a first server or a first communication apparatus to perform a first access restriction or not to perform the access restriction to an access from a user terminal to a site, a second server or a second communication apparatus to perform a second access restriction which is different from the first access restriction to an access from the user terminal to the site, and an access server, the connection restriction method comprising:
transmitting, by the access server, an authentication request to the authentication server when the access is performed from the user terminal;
receiving, from the authentication server, an authentication packet including an authentication result, a port change setting information to indicate whether port change is performed for the user terminal, one or plural port change times for changing the output destination port of the packet, a filtering setting information to indicate whether filtering is performed for the user terminal, a filtering start time and a filtering end time;
storing, correspondingly to a user identifier, the port change setting information, the port change time for changing the output destination port of the packet, the filtering setting information, the filtering start time and the filtering end time included in the authentication packet into a memory;
referring to the memory to change, in a case where the port change setting information on an arbitrary user identifier is set to perform the port change and when it becomes the corresponding port change time, an output destination of a packet from the user terminal of the user identifier to one of a port to which the first server or the first communication apparatus is connected and a port to which the second server or the second communication apparatus is connected; and
performing, in a case where the filtering setting information on an arbitrary user identifier is set to perform the filtering and when it becomes the corresponding filtering start time, the filtering on the port to which the user identifier is connected.

11. The connection restriction method according to claim 10, further comprising
changing the output port of the packet from the user terminal to the first and the second servers which are proxy servers different from each other in a use condition of HTTP according to the time period by referring to the memory, and Web browsing of the user terminal can be restricted according to the time period.

12. The connection restriction method according to claim 10, further comprising
referring to the memory, and starting the filtering on the port to which the user identifier is connected when it becomes the corresponding filtering start time, and ending the filtering when it becomes the filtering end time.

13. The connection restriction method according to claim 10, further comprising
filtering at least a packet on web browsing, and not filtering a mail and/or a music file.

14. The connection restriction method according to claim 10, further comprising
changing the output port of the packet to the first and the second communication apparatuses which are a first and a second routers from the user terminal according to the time period by referring to the memory, and distributes, for each time period, the packet to the first router not to perform the filtering and the second router to perform the filtering in cooperation with a DNS server.

15. The connection restriction method according to claim 10, further comprising
changing the output port number information of the memory which stores, correspondingly to a user identifier, output port number information to indicate a port for outputting the packet from the user terminal indicated by the user identifier, when it becomes the port change time, and
determining the output destination of the packet received from the user terminal in accordance with the output port number information of the memory.

16. The connection restriction method according to claim 10, further comprising
managing present time or, managing a time till the port change time, a time till the filtering start time or, a time till the filtering end time.

* * * * *